(12) United States Patent
Hamamoto

(10) Patent No.: US 7,319,712 B2
(45) Date of Patent: Jan. 15, 2008

(54) ORTHOGONAL CODE GENERATION APPARATUS, SCRAMBLING CODE GENERATION APPARATUS AND PORTABLE RADIO TERMINAL USING SUCH APPARATUS

(75) Inventor: Katsuaki Hamamoto, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 761 days.

(21) Appl. No.: 09/895,326

(22) Filed: Jul. 2, 2001

(65) Prior Publication Data

US 2002/0031167 A1 Mar. 14, 2002

(30) Foreign Application Priority Data

| Jul. 5, 2000 | (JP) | ............... 2000-203416 |
| May 22, 2001 | (JP) | ............... 2001-152589 |

(51) Int. Cl.
*H04B 1/69* (2006.01)

(52) U.S. Cl. ............ 375/130; 375/219; 375/354; 375/343; 370/208; 370/342; 380/35; 380/268

(58) Field of Classification Search ............ 375/130, 375/354, 343, 219; 370/208, 342; 380/35, 380/268

See application file for complete search history.

(56) References Cited

U.S. PATENT DOCUMENTS

| 3,795,864 | A | 3/1974 | Fullton, Jr. |
| 6,181,164 | B1 * | 1/2001 | Miller ......................... 326/46 |
| 6,263,443 | B1 * | 7/2001 | Anderson et al. ............ 713/201 |
| 6,385,259 | B1 * | 5/2002 | Sung et al. ................... 375/343 |
| 6,389,638 | B1 * | 5/2002 | Dickinson et al. ............ 15/261 |
| 6,665,962 | B2 * | 12/2003 | Shepherd ...................... 36/132 |
| 6,741,667 | B1 * | 5/2004 | Suda .......................... 375/354 |

FOREIGN PATENT DOCUMENTS

| EP | 0 809 364 A2 | 11/1997 |
| JP | 08-018550 | 1/1996 |
| JP | 08-095954 | 4/1996 |
| JP | 2000-151367 | 5/2000 |

OTHER PUBLICATIONS

Hamamoto et al., "Hardware Architecture of the Scrambling Code Generator for W-CDMA" Transaction of Communications Society Conference, IEICE, Aug. 29, 2001, 1, p. 419, B-5-133 with partial English language translation.

Office Communication from the Japanese Patent Office dated Mar. 12, 2004 in Application No. 2001-152589 with English language translation.

* cited by examiner

*Primary Examiner*—Chieh M. Fan
*Assistant Examiner*—Eva Zheng
(74) *Attorney, Agent, or Firm*—Westerman, Hattori, Daniels & Adrian, LLP.

(57) ABSTRACT

An orthogonal code generation apparatus can generate a sequence of orthogonal codes without having to prestore orthogonal code sequences in a memory, by applying logic operation on a sequence number and a location number using AND circuits $A_0, A_1, A_2, A_3, \ldots, A_n$ and an adder circuit. A scrambling code generation apparatus computes only the values of registers involved with a feedback operation and a spreading operation, and loads respective values into the registers while shifting the shift register. When all the registers store valid values, scrambling codes are generated by a shift operation of the shift register.

6 Claims, 14 Drawing Sheets

PERIOD INDEX : 0    $[H_0] = [\,0\,]$

PERIOD INDEX : 1    $[H_1] = \begin{bmatrix} H_0 & H_0 \\ H_0 & \overline{H_0} \end{bmatrix} = \begin{bmatrix} 0 & 0 \\ 0 & 1 \end{bmatrix}$ PERIOD INDEX : 2    $[H_2] = \begin{bmatrix} H_1 & H_1 \\ H_1 & \overline{H_1} \end{bmatrix} = \begin{bmatrix} 0 & 0 & 0 & 0 \\ 0 & 1 & 0 & 1 \\ 0 & 0 & 1 & 1 \\ 0 & 1 & 1 & 0 \end{bmatrix}$

⋮

PERIOD INDEX : k    $[H_k] = \begin{bmatrix} H_{k-1} & H_{k-1} \\ H_{k-1} & \overline{H_{k-1}} \end{bmatrix}$

FIG. 4

| | | \multicolumn{16}{c|}{LOCATION NUMBER (C)} |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| SEQUENCE NUMBER (B) | 0 | 0 | 0 | 0 | 0 | 0 | 0 | 0 | 0 | 0 | 0 | 0 | 0 | 0 | 0 | 0 | 0 |
| | 1 | 0 | 1 | 0 | 1 | 0 | 1 | 0 | 1 | 0 | 1 | 0 | 1 | 0 | 1 | 0 | 1 |
| | 2 | 0 | 0 | 1 | 1 | 0 | 0 | 1 | 1 | 0 | 0 | 1 | 1 | 0 | 0 | 1 | 1 |
| | 3 | 0 | 1 | 1 | 0 | 0 | 1 | 1 | 0 | 0 | 1 | 1 | 0 | 0 | 1 | 1 | 0 |
| | 4 | 0 | 0 | 0 | 0 | 1 | 1 | 1 | 1 | 0 | 0 | 0 | 0 | 1 | 1 | 1 | 1 |
| | 5 | 0 | 1 | 0 | 1 | 1 | 0 | 1 | 0 | 0 | 1 | 0 | 1 | 1 | 0 | 1 | 0 |
| | 6 | 0 | 0 | 1 | 1 | 1 | 1 | 0 | 0 | 0 | 0 | 1 | 1 | 1 | 1 | 0 | 0 |
| | 7 | 0 | 1 | 1 | 0 | 1 | 0 | 0 | 1 | 0 | 1 | 1 | 0 | 1 | 0 | 0 | 1 |
| | 8 | 0 | 0 | 0 | 0 | 0 | 0 | 0 | 0 | 1 | 1 | 1 | 1 | 1 | 1 | 1 | 1 |
| | 9 | 0 | 1 | 0 | 1 | 0 | 1 | 0 | 1 | 1 | 0 | 1 | 0 | 1 | 0 | 1 | 0 |
| | 10 | 0 | 0 | 1 | 1 | 0 | 0 | 1 | 1 | 1 | 1 | 0 | 0 | 1 | 1 | 0 | 0 |
| | 11 | 0 | 1 | 1 | 0 | 0 | 1 | 1 | 0 | 1 | 0 | 0 | 1 | 1 | 0 | 0 | 1 |
| | 12 | 0 | 0 | 0 | 0 | 1 | 1 | 1 | 1 | 1 | 1 | 1 | 1 | 0 | 0 | 0 | 0 |
| | 13 | 0 | 1 | 0 | 1 | 1 | 0 | 1 | 0 | 1 | 0 | 1 | 0 | 0 | 1 | 0 | 1 |
| | 14 | 0 | 0 | 1 | 1 | 1 | 1 | 0 | 0 | 1 | 1 | 0 | 0 | 0 | 0 | 1 | 1 |
| | 15 | 0 | 1 | 1 | 0 | 1 | 0 | 0 | 1 | 1 | 0 | 0 | 1 | 0 | 1 | 1 | 0 |

FIG. 6

VALUES OF LOCATION NUMBER EXCLUDING LEAST SIGNIFICANT BIT

VALUES OF SEQUENCE NUMBER EXCLUDING LEAST SIGNIFICANT BIT

| | 000 | 001 | 010 | 011 | 100 | 101 | 110 | 111 |
|---|---|---|---|---|---|---|---|---|
| 000 | $H_1$ | $H_1$ | $H_1$ | $H_1$ | $H_1$ | $H_1$ | $H_1$ | $H_1$ |
| 001 | $H_1$ | $\overline{H_1}$ | $H_1$ | $\overline{H_1}$ | $H_1$ | $\overline{H_1}$ | $H_1$ | $\overline{H_1}$ |
| 010 | $H_1$ | $H_1$ | $\overline{H_1}$ | $\overline{H_1}$ | $H_1$ | $H_1$ | $\overline{H_1}$ | $\overline{H_1}$ |
| 011 | $H_1$ | $\overline{H_1}$ | $\overline{H_1}$ | $H_1$ | $H_1$ | $\overline{H_1}$ | $\overline{H_1}$ | $H_1$ |
| 100 | $H_1$ | $H_1$ | $H_1$ | $H_1$ | $\overline{H_1}$ | $\overline{H_1}$ | $\overline{H_1}$ | $\overline{H_1}$ |
| 101 | $H_1$ | $\overline{H_1}$ | $H_1$ | $\overline{H_1}$ | $\overline{H_1}$ | $H_1$ | $\overline{H_1}$ | $H_1$ |
| 110 | $H_1$ | $H_1$ | $\overline{H_1}$ | $\overline{H_1}$ | $\overline{H_1}$ | $\overline{H_1}$ | $H_1$ | $H_1$ |
| 111 | $H_1$ | $\overline{H_1}$ | $\overline{H_1}$ | $H_1$ | $\overline{H_1}$ | $H_1$ | $H_1$ | $\overline{H_1}$ |

FIG. 7

VALUES OF LOCATION NUMBER EXCLUDING LEAST SIGNIFICANT BIT

VALUES OF SEQUENCE NUMBER EXCLUDING LEAST SIGNIFICANT BIT

| | 000 | 001 | 010 | 011 | 100 | 101 | 110 | 111 |
|---|---|---|---|---|---|---|---|---|
| 000 | 0 | 0 | 0 | 0 | 0 | 0 | 0 | 0 |
| 001 | 0 | 1 | 0 | 1 | 0 | 1 | 0 | 1 |
| 010 | 0 | 0 | 1 | 1 | 0 | 0 | 1 | 1 |
| 011 | 0 | 1 | 1 | 2 | 0 | 1 | 1 | 2 |
| 100 | 0 | 0 | 0 | 0 | 1 | 1 | 1 | 1 |
| 101 | 0 | 1 | 0 | 1 | 1 | 2 | 1 | 2 |
| 110 | 0 | 0 | 1 | 1 | 1 | 1 | 2 | 2 |
| 111 | 0 | 1 | 1 | 2 | 1 | 2 | 2 | 3 |

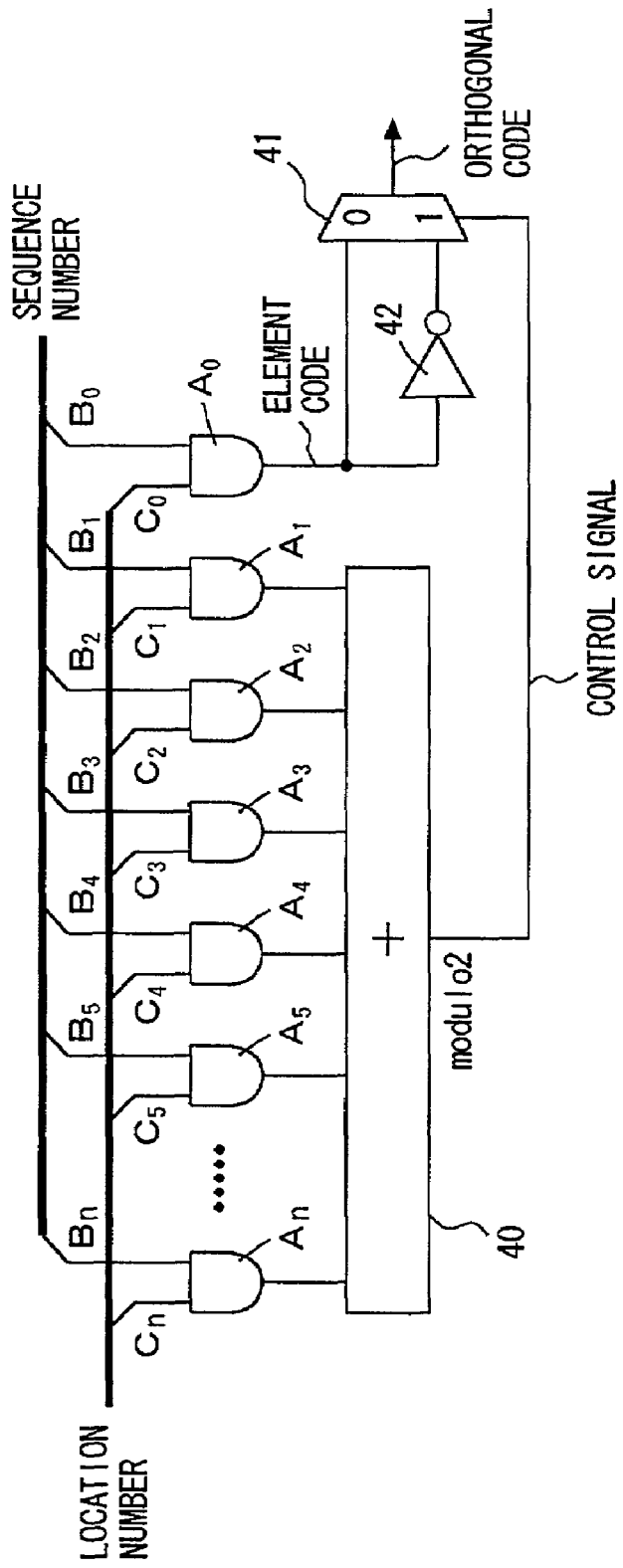
F I G. 8

F I G. 1 0

| | | \multicolumn{16}{c}{LOCATION NUMBER (C)} |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| | 0 | 0 | 0 | 0 | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 1 | 1 | 1 | 1 | 1 | 1 | 1 | 1 |
| | 2 | 0 | 0 | 0 | 0 | 1 | 1 | 1 | 1 | 0 | 0 | 0 | 0 | 1 | 1 | 1 | 1 |
| | 3 | 0 | 0 | 0 | 0 | 1 | 1 | 1 | 1 | 1 | 1 | 1 | 1 | 0 | 0 | 0 | 0 |
| | 4 | 0 | 0 | 1 | 1 | 0 | 0 | 1 | 1 | 0 | 0 | 1 | 1 | 0 | 0 | 1 | 1 |
| SEQUENCE | 5 | 0 | 0 | 1 | 1 | 0 | 0 | 1 | 1 | 1 | 1 | 0 | 0 | 1 | 1 | 0 | 0 |
| NUMBER | 6 | 0 | 0 | 1 | 1 | 1 | 1 | 0 | 0 | 0 | 0 | 1 | 1 | 1 | 1 | 0 | 0 |
| (B) | 7 | 0 | 0 | 1 | 1 | 1 | 1 | 0 | 0 | 1 | 1 | 0 | 0 | 0 | 0 | 1 | 1 |
| | 8 | 0 | 1 | 0 | 1 | 0 | 1 | 0 | 1 | 0 | 1 | 0 | 1 | 0 | 1 | 0 | 1 |
| | 9 | 0 | 1 | 0 | 1 | 0 | 1 | 0 | 1 | 1 | 0 | 1 | 0 | 1 | 0 | 1 | 0 |
| | 10 | 0 | 1 | 0 | 1 | 1 | 0 | 1 | 0 | 0 | 1 | 0 | 1 | 1 | 0 | 1 | 0 |
| | 11 | 0 | 1 | 0 | 1 | 1 | 0 | 1 | 0 | 1 | 0 | 1 | 0 | 0 | 1 | 0 | 1 |
| | 12 | 0 | 1 | 1 | 0 | 0 | 1 | 1 | 0 | 0 | 1 | 1 | 0 | 0 | 1 | 1 | 0 |
| | 13 | 0 | 1 | 1 | 0 | 0 | 1 | 1 | 0 | 1 | 0 | 0 | 1 | 1 | 0 | 0 | 1 |
| | 14 | 0 | 1 | 1 | 0 | 1 | 0 | 0 | 1 | 0 | 1 | 1 | 0 | 1 | 0 | 0 | 1 |
| | 15 | 0 | 1 | 1 | 0 | 1 | 0 | 0 | 1 | 1 | 0 | 0 | 1 | 0 | 1 | 1 | 0 |

ORTHOGONAL CODE GENERATION APPARATUS, SCRAMBLING CODE GENERATION APPARATUS AND PORTABLE RADIO TERMINAL USING SUCH APPARATUS

BACKGROUND OF THE INVENTION

1. Field of the Invention

The present invention relates to an orthogonal code generation apparatus, a scrambling code generation apparatus, and a portable radio terminal using such apparatus. More particularly, the present invention relates to an orthogonal code generation apparatus generating an orthogonal code used in the spreading or despreading operation of transmission data or reception data, a scrambling code generation apparatus generating a scrambling code used in the scrambling operation of transmission data, and a portable radio terminal including such a code generation apparatus in digital radio communication.

2. Description of the Background Art

In the digital radio communication method such as the CDMA (Code Division Multiple Access) method used in mobile communication systems, a double spreading method set forth below is employed.

As to the uplink transmitting data from a portable radio terminal to a base station, a two-stage operation is carried out at the portable radio terminal. More specifically, digital data (symbol data) to be transmitted is subjected to a spreading operation with an orthogonal code, and then scrambled with a scrambling code.

The spreading operation of the transmission data (symbol data) with an orthogonal code is employed in order to transmit more data. In the case where symbol data of a plurality of channels are multiplexed at the terminal to be transmitted to the base station through one channel, data transmission for the plurality of channels is possible at a rate higher than the maximum transmission rate of one channel by applying a spreading operation on the symbol data of the plurality of channels with a plurality of corresponding orthogonal code sequences (sequence of codes each having a time width smaller than that of symbol), and then multiplexing the obtained transmission data (chip data) of the plurality of channels.

Such transmission data (chip data) is scrambled with a scrambling code inherent to each user (terminal) for identifying each user, and then transmitted to the base station.

As to the downlink transmitting data from the base station to a portable radio terminal, a two-stage operation is carried out at the base station. More specifically, digital data (symbol data) to be transmitted is subjected to a spreading operation with an orthogonal code, and then scrambled with a scrambling code.

In order to identify the channel, transmission data (symbol data) is subjected to a spreading operation with an orthogonal code sequence (sequence of codes each having a time width shorter than that of symbol) for each channel.

The obtained transmission data (chip) is scrambled with a scrambling code inherent to each cell (base station) for identifying each cell, and then transmitted to a portable radio terminal.

Although respective objects differ, the two-stage operation of spreading and scrambling is carried out using two types of codes, i.e., an orthogonal code and scrambling code, at the uplink and downlink. Thus, this method is called a double spreading method.

A portable radio terminal of digital radio communication employing this double spreading method must be configured as set forth below.

In order to transmit data to the base station, an orthogonal code generation apparatus generating a sequence of orthogonal codes for the spreading operation of transmission data (symbol data) is required. Also, a scrambling code generation apparatus generating a sequence of scrambling codes for the scrambling operation of transmission data (chip data) is required.

In order to receive data subjected to the aforementioned spreading and scrambling operations at the base station, a scrambling code generation apparatus generating a sequence of scrambling codes for the descrambling operation of reception data (chip data) as well as an orthogonal code generation apparatus generating a sequence of orthogonal codes for the inverse spreading operation of reception data (chip data) are required.

Although the same type of orthogonal code generation apparatus can be used for the spreading operation of transmission data and the inverse spreading operation of reception data, different types of scrambling code generation apparatuses are used in the scrambling operation of transmission data and the descrambling operation of reception data for reasons of circuit configuration.

An orthogonal code generation apparatus employed in the spreading operation of transmission data and reception data at a portable radio terminal will be described hereinafter.

An orthogonal code generation apparatus is configured to have a plurality of orthogonal code sequences, each formed of a plurality of bits (a multi-bit period), entirely prestored in a memory, and generate an address of data to be read out from the memory, based on a sequence number specifying an orthogonal code sequence to be generated and a location number specifying the location of an orthogonal code to be generated from the specified orthogonal code sequence, and then read out the addressed data from the memory for output as the orthogonal code.

The output orthogonal code is multiplied (exclusive OR operation) by the transmission digital data (symbol data). Thus, the transmission digital data is subjected a spreading operation.

FIG. 14 is a block diagram showing an example of a conventional orthogonal code generation apparatus. The orthogonal code generation apparatus of FIG. 14 basically includes an address generator 10a, a memory 10b, and a parallel-serial conversion circuit 10c.

Referring to FIG. 14, a plurality of sequences of orthogonal codes are prestored in memory 10b. Each sequence has a multi-bit period (for example, in the CDMA standard, variable within the range of the period of 256 bits at most).

The sequence number specifying a sequence of orthogonal codes to be used in the spreading operation with the transmission digital data among the plurality of sequences of orthogonal codes is applied from a control circuit not shown to address generator 10a. In general, the specified orthogonal code sequence of a multi-bit period is divided into unit data each of a plurality of bits (for example, the unit of 4 bits) to be read out from memory 10b. Therefore, a location number specifying the head bit location of each data is also applied from a control circuit not shown to address generator 10a.

Address generator 10a generates an address and a memory access control signal to read out from memory 10b the specified data of a plurality of bits from the specified sequence of orthogonal codes based on the applied sequence number and location number. The generated address and memory access control signal are provided to memory 10b.

Data of a plurality of bits from the sequence of orthogonal codes identified by the applied address are read out together at one time from memory 10b to be applied to parallel-serial conversion circuit 10c. Parallel-serial conversion circuit 10c converts the data of a plurality of bits read out from memory 10b into a train of bits in series. The data is output as a sequence of orthogonal codes. The output orthogonal code sequence is subjected to a spreading operation with the transmission data.

A scrambling code generation apparatus employed in the scrambling operation of transmission data at a portable radio terminal will be described hereinafter.

The scrambling code generation apparatus is configured to have an initial value inherent to the relevant terminal set in a shift register configured based on a predetermined generating polynomial. In order to establish timing with the generation of scrambling codes for descrambling in the base station at the reception side, a shift operation is effected for a predetermined number of times based on the initial value. Then, codes are continuously output as a sequence of scrambling codes.

The output scrambling code sequence is multiplied by the transmission digital data (chip data). Thus, transmission digital data is scrambled.

FIG. 15 is a block diagram showing an example of a conventional scrambling code generation apparatus. FIG. 15 is particularly directed to a scrambling code generation apparatus configured to generate a scrambling code sequence by a generating polynomial set forth below.

$$f(X) = X^4 + X^2 + 1$$

The scrambling code generation apparatus of FIG. 15 includes a shift register basically formed of four cascade-connected registers 11, 12, 13 and 14. Selectors 15, 16, 17 and 18 are provided at the preceding stages of corresponding registers.

An initial value buffer 19 stores initial values $Ri_3$, $Ri_2$, $Ri_1$ and $Ri_0$ that will be described afterwards. Initial value buffer 19 is implemented with, for example, a memory, a register, or the like.

Each of selectors 15-18 responds to a control signal applied from a control circuit not shown to select an output Rs from the preceding-stage register or a corresponding initial value Ri stored in initial value buffer 19 to provide the selected value to the D input of the register of the next stage.

More specifically, selector 15 selects either an output from an exclusive OR circuit 20 or initial value $Ri_3$, and sets the selected value in register 11 as input $D_3$.

Selector 16 selects output $Rs_3$ of the preceding-stage register 11 or initial value $Ri_2$, and sets the selected value in register 12 as input $D_2$. Output $Rs_2$ of register 12 is applied to one input of register 17 and also fed back to one input of exclusive OR circuit 20.

Selector 17 selects output $Rs_2$ of the preceding-stage register 12 or initial value $Ri_1$, and sets the selected value in register 13 as input $D_1$.

Selector 18 selects output $Rs_1$ of the preceding-stage register 13 or initial value $Ri_0$, and sets the selected value in register 14 as input $D_0$. Output $Rs_0$ of register 14 is output (spreading operated) from the shift register as a scrambling code, and also fed back to the other input of exclusive OR circuit 20.

The operation of scrambling code generation by the scrambling code generation apparatus of FIG. 15 will be described here. Although a shift register is configured including 25 stages of registers according to the standard of the current digital radio communication (for example, the digital radio communication of the W (Wideband)-CDMA method recently developed), a simplified shift register formed of registers of 4 stages is taken as an example for description hereinafter for the sake of simplifying the drawings.

Initial values $Ri_3$, $Ri_2$, $Ri_1$ and $Ri_0$ (excluding the case of all 0) inherent to the relevant terminal are set in initial value buffer 19. The initial values are loaded via corresponding selectors 15-18 to the four registers 11-14, respectively. Then, a shift operation is effected based on the loaded initial values, while scrambling code $Rs_0$ is sequentially output from register 14. Registers 11-14 are set with inputs $D_3$, $D_2$, $D_1$ and $D_0$, respectively, represented by the following expression for each one shift operation.

$$D_3 \leftarrow Rs_2 \oplus Rs_0$$

$$D_2 \leftarrow Rs_3$$

$$D_1 \leftarrow Rs_2$$

$$D_0 \leftarrow Rs_1 \qquad \text{[Expression 1]}$$

This operation can be represented as below using a matrix. The addition employed in the following operation (including matrix operation) is modulo 2 addition.

$$\begin{bmatrix} D_3 \\ D_2 \\ D_1 \\ D_0 \end{bmatrix} = \begin{bmatrix} 0 & 1 & 0 & 1 \\ 1 & 0 & 0 & 0 \\ 0 & 1 & 0 & 0 \\ 0 & 0 & 1 & 0 \end{bmatrix} \begin{bmatrix} Rs_3 \\ Rs_2 \\ Rs_1 \\ Rs_0 \end{bmatrix} \qquad \text{[Expression 2]}$$

Respective values in registers 11-14 after being shifted once from respective loading of the above four initial values into registers 11-14 are represented by the matrix below.

$$\begin{bmatrix} D_3 \\ D_2 \\ D_1 \\ D_0 \end{bmatrix} = \begin{bmatrix} 0 & 1 & 0 & 1 \\ 1 & 0 & 0 & 0 \\ 0 & 1 & 0 & 0 \\ 0 & 0 & 1 & 0 \end{bmatrix} \begin{bmatrix} Ri_3 \\ Ri_2 \\ Ri_1 \\ Ri_0 \end{bmatrix} \qquad \text{[Expression 3]}$$

Respective values in registers 11-14 after being shifted twice is represented by the following matrix.

$$\begin{bmatrix} D_3 \\ D_2 \\ D_1 \\ D_0 \end{bmatrix} = \begin{bmatrix} 0 & 1 & 0 & 1 \\ 1 & 0 & 0 & 0 \\ 0 & 1 & 0 & 0 \\ 0 & 0 & 1 & 0 \end{bmatrix} \begin{bmatrix} 0 & 1 & 0 & 1 \\ 1 & 0 & 0 & 0 \\ 0 & 1 & 0 & 0 \\ 0 & 0 & 1 & 0 \end{bmatrix} \begin{bmatrix} Ri_3 \\ Ri_2 \\ Ri_1 \\ Ri_0 \end{bmatrix} \qquad \text{[Expression 4]}$$

$$= \begin{bmatrix} 1 & 0 & 1 & 0 \\ 0 & 1 & 0 & 1 \\ 1 & 0 & 0 & 0 \\ 0 & 1 & 0 & 0 \end{bmatrix} \begin{bmatrix} Ri_3 \\ Ri_2 \\ Ri_1 \\ Ri_0 \end{bmatrix}$$

In general, respective values $D_{3(t)}$, $D_{2(t)}$, $D1(t)$, and $D_{0(t)}$ in registers 11-14 subjected to a shift operation t times after the loading of respective initial values into registers 11-14 are represented by the following matrix.

$$\begin{bmatrix} D_{3(t)} \\ D_{2(t)} \\ D_{1(t)} \\ D_{0(t)} \end{bmatrix} = \begin{bmatrix} 0 & 1 & 0 & 1 \\ 1 & 0 & 0 & 0 \\ 0 & 1 & 0 & 0 \\ 0 & 0 & 1 & 0 \end{bmatrix}^t \begin{bmatrix} Ri_3 \\ Ri_2 \\ Ri_1 \\ Ri_0 \end{bmatrix}$$ [Expression 5]

Starting from the load of initial values into registers 11-14, the value set in register 14 is determined by repeating a shift operation, whereby code $Rs_0$ will sequentially be generated.

It is to be noted that, according to the standard of the current digital radio communication (for example W-CDMA), the code generated continuously from each shift operation starting from the initial value is not directly used as the scrambling code. As mentioned before, in order to establish timing with the reception side, it is defined by the standard to output the register value as a scrambling code after a shift operation is effected t times (for example, 100 times) from the loading of initial values to registers 11-14. In other words, a scrambling code is not generated until a shift operation is carried out 100 times from the load of the initial values. A shift operation of 100 times is time consuming (particularly when there are many stages in the shift register).

By using the above indicated matrix that obtains a register value after t shift operations, the desired register value can be obtained through calculation even if the shift register does not actually perform a shift operation t times.

If it is defined to initiate generation of a scrambling code sequence from a register value after a shift operation is carried out 100 times from the loading of initial values according to the digital radio communication standard, the values $D_{3(100)}$, $D_{2(100)}$, $D_{1(100)}$ and $D_{0(100)}$ in registers 11-14 after a shift operation is effected 100 times can be obtained at once through the calculation of the following expression.

$$\begin{bmatrix} D_{3(100)} \\ D_{2(100)} \\ D_{1(100)} \\ D_{0(100)} \end{bmatrix} = \begin{bmatrix} 0 & 1 & 0 & 1 \\ 1 & 0 & 0 & 0 \\ 0 & 1 & 0 & 0 \\ 0 & 0 & 1 & 0 \end{bmatrix}^{100} \begin{bmatrix} Ri_3 \\ Ri_2 \\ Ri_1 \\ Ri_0 \end{bmatrix}$$ [Expression 6]

$$= \begin{bmatrix} 0 & 0 & 1 & 0 \\ 0 & 0 & 0 & 1 \\ 1 & 0 & 1 & 0 \\ 0 & 1 & 0 & 1 \end{bmatrix} \begin{bmatrix} Ri_3 \\ Ri_2 \\ Ri_1 \\ Ri_0 \end{bmatrix}$$

The matrix of determining each register value after 100 shift operations of this expression can be segmented into M matrixes $M_{3(100)}$, $M_{2(100)}$, $M_{1(100)}$, and $M_{0(100)}$ for respective rows as indicated by the following expression.

$M_{3(100)}=[0\ 0\ 1\ 0]$ $M_{2(100)}=[0\ 0\ 0\ 1]$ $M_{1(100)}=[1\ 0\ 1\ 0]$ $M_{0(100)}=[0\ 1\ 0\ 1]$ [Expression 7]

By obtaining and storing these matrixes in advance, application of initial values for each user allows respective values of registers 11-14 after 100 shift operations to be calculated immediately. Then, by continuing the subsequent shift operation of the shift register, a sequence of scrambling codes following the shift operation of 100 times from the loading of the initial values can be sequentially generated.

FIG. 16 is a block diagram showing a scrambling code generation apparatus that can immediately determine a register value after, for example, 100 shift operations, from loading of the initial values to initiate generation of a sequence of scrambling codes.

In FIG. 16, the structure of the shift register including registers 11-14, selectors 15-18 and exclusive OR circuit 20 is similar to that of the shift register shown in FIG. 15. Therefore, description thereof will not be repeated.

According to the circuit configuration of FIG. 16, an arithmetic circuit 21 includes a memory or register in which M matrixes $M_{3(100)}$, $M_{2(100)}$, $M_{1(100)}$, and $M_{0(100)}$ to determine respective register values after 100 shift operations. Alternatively, arithmetic circuit 21 is implemented with the hardware of logic gates combined so as to generate these M matrixes. An initial value buffer 22 is applied with initial values $Ri=[Ri_3, Ri_2, Ri_1, Ri_0]$ inherent to the relevant terminal. Initial value buffer 22 is implemented with, for example, a memory, a register or the like.

Arithmetic circuit 21 multiplies the above M matrixes by the initial values Ri applied to initial value buffer 22 to calculate values $Ro_3$, $Ro_2$, $Ro_1$, and $Ro_0$ of registers 1-4 after 100 shift operations.

The obtained register values are loaded to corresponding registers 11-14 via selectors 15-18, respectively, at a predetermined timing. By performing a shift operation of the shift register thereafter, output code $Rs_0$ of register 14 subsequent to the shift operation of 100 times can be sequentially output as a sequence of scrambling codes. The output scrambling code sequence is used in the scrambling operation with the transmission data.

The conventional orthogonal code generation apparatus of FIG. 14 has all the orthogonal code sequences that will be specified stored in memory 10b. This means that, when 16 sequences of orthogonal codes of the period of 16 bits, for example, are to be stored in memory 10b, the square of the bit period, i.e., 16×16 bits, is required for the storage capacity.

Since the required memory capacity generally corresponds to the square of the bit period of the orthogonal code sequence, the required memory capacity will increase significantly as the bit period of the orthogonal code sequence to be stored becomes longer. The circuit complexity of the orthogonal code generation apparatus will become higher significantly.

The conventional scrambling code generation apparatus of FIG. 16 has the problem that the circuit complexity of arithmetic circuit 21 is increased. Although a shift register of four stages of registers is taken as an example for the sake of simplification in the above description of FIG. 16, a shift register of many stages, for example 25 stages, is employed according to the current standard and specification. The circuit complexity of arithmetic circuit 21 will become greater in proportion to the number of stages of the shift register.

SUMMARY OF THE INVENTION

In view of the foregoing, an object of the present invention is to provide an orthogonal code generation apparatus realizing reduction in circuit complexity.

Another object of the present invention is to provide a scrambling code generation apparatus realizing reduction in circuit complexity.

A further object of the present invention is to provide a portable radio terminal including an orthogonal code generation apparatus realizing reduction in circuit complexity.

Still another object of the present invention is to provide a portable radio terminal including a scrambling code generation apparatus realizing reduction in circuit complexity.

According to an aspect of the present invention, an orthogonal code generation apparatus generating an orthogonal code used in a data spreading operation includes a signal source supplying a sequence number and a location number, a first logic operation circuit, a second logic operation circuit, and a select circuit. The signal source supplying a sequence number and a location number supplies a sequence number of n (n is a positive integer) bits specifying an orthogonal code sequence to be generated among a plurality of orthogonal code sequences defined based on a predetermined orthogonal code generation rule, and a location number of n bits specifying a position of an orthogonal code to be sequentially generated from the specified orthogonal code sequence. The first logic operation circuit generates an element code by sequentially applying a logic operation on the least significant bit of the sequence number and the least significant bit of the location number. By repeatedly arranging a combination of element codes that can be generated by logic operation on the least significant bits and an inverted version of that combination based on a pattern of the combination of element codes, the plurality of orthogonal code sequences are defined entirely. The second logic operation circuit sequentially applies logic operation on (n−1) bits of the sequence number excluding the least significant bit and (n−1) bits of the location number excluding the least significant bit. The select circuit selects, based on an arrangement of the combination, either the element code generated by the first logic operation circuit or an inverted code of the generated element code in response to a computation result of the second logic operation circuit, and provides the selected code as the orthogonal code.

Preferably, the first logic operation circuit includes an AND circuit sequentially ANDing the least significant bit of the sequence number and the least significant bit of the location number and generating the ANDed value as the element code. The combination of element codes that can be generated includes three codes "0" and one code "1". The inverted version of this combination includes three codes "1" and one code "0".

Preferably, the second logic operation circuit includes a determination circuit determining whether the number of digits where both of corresponding digits take a value of 1 between (n−1) bits of the sequence number excluding the least significant bit and (n−1) bits of the location number excluding the least significant bit is 0 or an even number, or an odd number. The select circuit selects as an orthogonal code an element code generated by the AND circuit when a determination result by the determination circuit exhibits 0 or an even number, and selects as an orthogonal code an inverted code of the element code when the determination result exhibits an odd number.

Preferably, the determination circuit includes (n−1) AND circuits ANDing values in corresponding digits between (n−1) bits of the sequence number excluding the least significant bit and (n−1) bits of the location number excluding the least significant bit, and an adder circuit adding the AND results of the (n−1) AND circuits to generate a control signal indicating whether the result of addition is 0 or an even number, or an odd number.

Preferably, the orthogonal code generation apparatus further includes a location number modify circuit modifying arrangement of predetermined bits among the supplied location number of n bits.

Preferably, repetition of an arrangement based on a pattern of the combination of element codes is defined by a period index k (k is a positive integer). The number of the plurality of orthogonal code sequences is represented by $2^k$. The number of bits of each of the plurality of orthogonal code sequences is represented by $2^k$. The location number modify circuit modifies arrangement of the lower k bits of the location number of n bits so as to be in reverse order from the least significant bit to the k-th bit.

According to another aspect of the present invention, a portable radio terminal of digital radio communication includes a modem processing data for transmission and reception, and a radio processor applying processing for radio communication on transmission data of the modem to send out the processed data as a transmission radio signal, and applying processing for radio communication on a received reception radio signal to apply the processed signal to the modem as reception data. The modem includes an orthogonal code generation apparatus generating an orthogonal code used in a spreading operation of the data. The orthogonal code generation apparatus includes a signal source supplying a sequence number and a location number, a first logic operation circuit, a second logic operation circuit, and a select circuit. The signal source supplying a sequence number and a location number supplies a sequence number of n (n is a positive integer) bits specifying an orthogonal code sequence to be generated among a plurality of orthogonal code sequences defined based on a predetermined orthogonal code generation rule, and a location number of n bits specifying a position of an orthogonal code to be sequentially generated from the specified orthogonal code sequence. The first logic operation circuit generates an element code by sequentially applying a logic operation on the least significant bit of the sequence number and the least significant bit of the location number. By repeatedly arranging a combination of element codes that can be generated by logic operation on the least significant bits and an inverted version of that combination based on a pattern of the combination of element codes, the plurality of orthogonal code sequences are defined entirely. The second logic operation circuit sequentially applies logic operation on (n−1) bits of the sequence number excluding the least significant bit and (n−1) bits of the location number excluding the least significant bit. The select circuit selects, based on an arrangement of the combination, either the element code generated by the first logic operation circuit or an inverted code of the generated element code in response to a computation result of the second logic operation circuit, and provides the selected code as the orthogonal code.

Preferably, the first logic operation circuit includes an AND circuit sequentially ANDing the least significant bit of the sequence number and the least significant bit of the location number and generating the ANDed value as the element code. The combination of element codes that can be generated includes three codes "0" and one code "1". The inverted version of this combination includes three codes "1" and one code "0".

Preferably, the second logic operation circuit includes a determination circuit determining whether the number of digits where both of corresponding digits take a value 1 between (n−1) bits of the sequence number excluding the least significant bit and (n−1) bits of the location number excluding the least significant bit is 0 or an even number, or an odd number. The select circuit selects as an orthogonal code an element code generated by the AND circuit when a determination result by the determination circuit exhibits 0 or an even number, and selects as an orthogonal code an inverted code of the element code when the determination result exhibits an odd number.

Preferably, the determination circuit includes (n−1) AND circuits ANDing values in corresponding digits between (n−1) bits of the sequence number excluding the least significant bit and (n−1) bits of the location number excluding the least significant bit, and an adder circuit adding the AND results of the (n−1) AND circuits to generate a control signal indicating whether the result of addition is 0 or an even number, or an odd number.

Preferably, the orthogonal code generation apparatus further includes a location number modify circuit modifying arrangement of predetermined bits among the supplied location number of n bits.

Preferably, repetition of an arrangement based on a pattern of the combination of element codes is defined by a period index k (k is a positive integer). The number of the plurality of orthogonal code sequences is represented by $2^k$. The number of bits of each of the plurality of orthogonal code sequences is represented by $2^k$. The location number modify circuit modifies arrangement of the lower k bits of the location number of n bits so as to be in reverse order from the least significant bit to the k-th bit.

According to another aspect of the present invention, a scrambling code generation apparatus generating a scrambling code used in a scrambling operation of transmission data includes a shift register, an arithmetic circuit, an input circuit, and a control circuit. The shift register is formed of a plurality of stages of registers connected so as to execute a feedback operation and a spreading operation to generate a sequence of scrambling codes by a predetermined generating polynomial. The arithmetic circuit computes values of the registers involved with the feedback operation and the spreading operation that would have been obtained if the shift register carries out a shift operation for an increasing predetermined number of times based on predetermined initial values. The input circuit applies the computed values of registers into corresponding registers. The control circuit controls the arithmetic circuit and the input circuit so that the arithmetic circuit computes values of the registers and the input circuit applies the computed values to the registers until all the plurality of stages of registers store valid values based on computed and input values. The shift register continues a shift operation based on valid values stored in all of the plurality of stages of registers to generate the sequence of scrambling codes.

Preferably, the scrambling code generation apparatus includes a storage circuit storing the predetermined initial values, and a matrix supply circuit supplying a matrix to determine values of registers involved with the feedback operation and the spreading operation after shift operations of the increasing predetermined number of times based on the predetermined generating polynomial. The arithmetic circuit multiplies the predetermined initial values stored in the storage circuit by the matrix supplied from the matrix supply circuit to compute values of the registers.

Preferably, the scrambling code generation apparatus further includes a storage circuit storing the predetermined initial values. The arithmetic circuit obtains by a predetermined operation a matrix to determine values of registers involved with the feedback operation and the spreading operation after shift operations of the increasing predetermined number of times based on the predetermined generating polynomial, and multiplies by the predetermined initial values stored in the storage circuit to compute values of the registers.

According to a further aspect of the present invention, a scrambling code generation apparatus generating a scrambling code used in a scrambling operation of transmission data includes a storage circuit, a logic circuit, and an arithmetic circuit. The storage circuit stores predetermined initial values. The logic circuit obtains by a predetermined operation a matrix to determine a value of each code forming the sequence of scrambling codes based on a predetermined generating polynomial. The arithmetic circuit multiplies the predetermined initial values stored in the storage circuit by the obtained matrix to compute a value of each code forming the sequence of scrambling codes.

According to still another aspect of the present invention, a portable radio terminal of digital radio communication includes a transmission related modem modulating transmission data, and a radio processor applying processing for radio communication on transmission data of the transmission related modem to send out the processed data as transmission radio signal. The transmission related modem includes a scrambling code generation apparatus generating a scrambling code used in a scrambling operation of the transmission data. The scrambling code generation apparatus includes a shift register, an arithmetic circuit, an input circuit, and a control circuit. The shift register is formed of a plurality of stages of registers connected so as to execute a feedback operation and a spreading operation to generate a sequence of scrambling codes by a predetermined generating polynomial. The arithmetic circuit computes values of the registers involved with the feedback operation and the spreading operation that would have been obtained if the shift register carries out a shift operation for an increasing predetermined number of times based on predetermined initial values. The input circuit applies the computed values of registers into corresponding registers. The control circuit controls the arithmetic circuit and the input circuit so that the arithmetic circuit computes values of the registers and the input circuit applies the computed values to the registers until all the plurality of stages of registers store valid values based on computed and input values. The shift register continues a shift operation based on valid values stored in all of the plurality of stages of registers to generate the sequence of scrambling codes.

Preferably, the scrambling code generation apparatus includes a storage circuit storing the predetermined initial values, and a matrix supply circuit supplying a matrix to determine values of registers involved with the feedback operation and the spreading operation after shift operations of the increasing predetermined number of times based on the predetermined generating polynomial. The arithmetic circuit multiplies the predetermined initial values stored in the storage circuit by the matrix supplied from the matrix supply circuit to compute values of the registers.

Preferably, the scrambling code generation apparatus further includes a storage circuit storing the predetermined initial values. The arithmetic circuit obtains by a predetermined operation a matrix to determine values of registers involved with the feedback operation and the spreading operation after shift operations of the increasing predetermined number of times based on the predetermined generating polynomial, and multiplies by the predetermined initial values stored in the storage circuit to compute the value of the registers.

According to a still further aspect of the present invention, a portable radio terminal of digital radio communication includes a transmission related modem modulating transmission data, and a radio processor applying processing for radio communication on transmission data of the transmission related modem to send out the processed data as transmission radio signal. The transmission related modem includes a scrambling code generation apparatus generating a scrambling code used in a scrambling operation of the transmission data. The scrambling code generation apparatus includes a storage circuit, a logic circuit, and an arithmetic circuit. The storage circuit stores predetermined initial values. The logic circuit obtains by a predetermined operation a matrix to determine a value of each code forming the sequence of scrambling codes based on a predetermined generating polynomial. The arithmetic circuit multiplies the predetermined initial values stored in the storage circuit by the obtained matrix to compute a value of each code forming the sequence of scrambling codes.

According to the present invention, the required orthogonal codes are generated by a result of logic operation on a specified sequence number and location number from a plurality of orthogonal code sequences defined based on a predetermined orthogonal code generation rule. Therefore, a memory to prestore a plurality of orthogonal code sequences is dispensable. Increase of the circuit complexity for the orthogonal code generation apparatus can be suppressed even if the bit period of the required orthogonal code sequence is increased.

According to the present invention, only the values of registers involved with the feedback operation and spreading operation among a plurality of stages of registers forming the shift register are computed by the arithmetic circuit. Therefore, increase in the circuit complexity of the scrambling code generation apparatus can be suppressed even when the number of stages of the shift register is increased.

According to the present invention, a matrix to determine a value of each code forming a sequence of scrambling codes is obtained, which is multiplied by predetermined initial values to compute a value of each code forming a sequence of spreading codes. Therefore, a sequence of scrambling codes can be generated without the usage of a shift register.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows orthogonal codes that can be generated by the orthogonal code generation apparatus according to a first embodiment of the present invention.

FIG. 6 shows orthogonal codes of the present invention represented by matrixes of element codes.

FIG. 7 shows an inverting status of the matrixes of element codes of FIG. 6 in numeric.

FIGS. 8 and 9 are schematic block diagrams of an orthogonal code generation apparatus according to first and second embodiments, respectively, of the present invention.

FIG. 10 shows orthogonal codes that can be generated by the orthogonal code generation apparatus of the second embodiment of the present invention.

Figure 1:
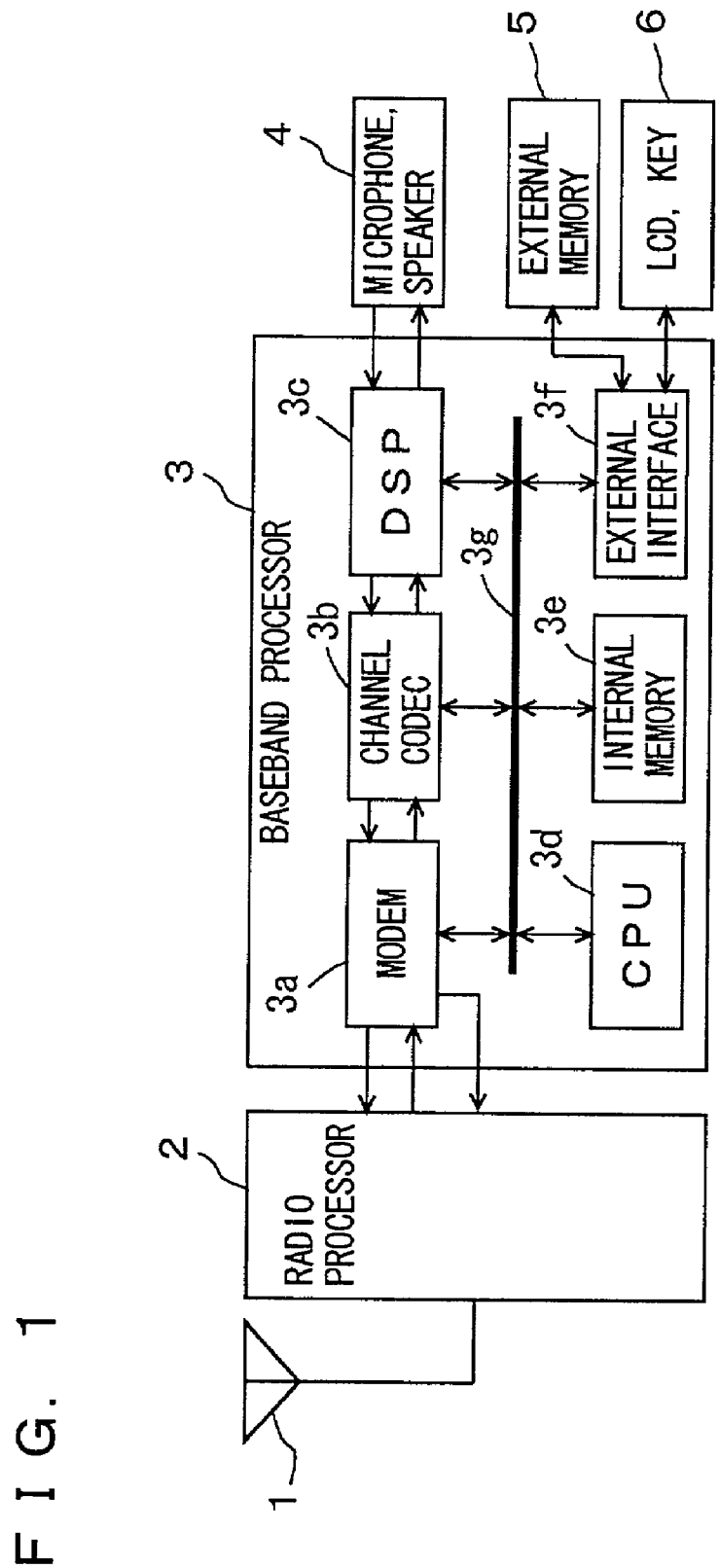
FIG. 1 is a schematic block diagram of a portable radio terminal to which is applied an orthogonal code generation apparatus and scrambling code generation apparatus of the present invention.

DESCRIPTION OF THE PREFERRED
EMBODIMENTS

Embodiments of the present invention will be described in detail with reference to the drawings. In the drawings, the same or corresponding components have the same reference characters allotted, and description thereof will not be repeated.

FIG. 1 is a schematic block diagram showing an entire structure of a portable radio terminal of digital radio communication to which are applied an orthogonal code generation apparatus and scrambling code generation apparatus of the present invention.

The portable radio terminal of FIG. 1 is mainly formed of an antenna 1, a radio processor 2, a baseband processor 3, an audio input/output device 4 including a microphone and a speaker, an external memory 5, and a display/input device 6 including a liquid crystal display (LCD) and keys.

Baseband processor 3 includes a modem 3a, a channel codec 3b, a digital signal processor (DSP hereinafter) 3c, a central processing unit (CPU hereinafter) 3d, an internal memory 3e, an external interface 3f, and an internal bus 3g.

The radio wave signal from a base station not shown, received at antenna 1, is converted into a signal of the baseband by radio processor 2 to be applied to baseband processor 3.

At baseband processor 3, the received signal is demodulated by modem 3a, and further decoded by channel codec 3b and applied to DSP 3c.

DSP 3c applies data processing on the reception signal to drive the speaker of audio input/output device 4. Thus, the received signal is converted into audio.

The audio input through the microphone of audio input/output device 4 is subjected to data processing at DSP 3c and applied to channel codec 3b. Channel codec 3b encodes the applied audio signal and applies the encoded signal to modem 3a. Modem 3a modulates the applied transmission signal and provides the modulated signal to radio processor 2. Radio processor 2 applies processing for radio communication on the transmission signal, and transmits the processed signal towards a base station not shown via antenna 1.

Modem 3a, channel codec 3b and DSP 3c are connected to CPU 3d, internal memory 3e, and external interface 3f through an internal bus 3g. CPU 3d provides control of the entire operation of the portable radio terminal of FIG. 1 according to a program stored in internal memory 3e. External interface 3f functions as an interface of external memory 5 and display/input device 6.

The orthogonal code generation apparatus of the present invention is used to generate a sequence of orthogonal codes used in the spreading operation of transmission data at the transmission related modem, or to generate a sequence of orthogonal codes used in the inverse spreading operation of reception data at the reception related modem. For reasons of circuit configuration, the scrambling code generation apparatus of the present invention is employed to generate a sequence of scrambling codes used in the scrambling operation of transmission data at the transmission related modem.

The structure of the transmission related modem, to which an orthogonal code generation apparatus and scrambling code generation apparatus of the present invention are applied, within modem 3a of FIG. 1 is set forth below. Description of the structure of the reception related modem to which only an orthogonal code generation apparatus is applied will not be provided here.

Although the present invention is directed to an orthogonal code generation apparatus and description of a reception related modem is not provided here, it is appreciated that the orthogonal code generation apparatus of the present invention is also applied to the reception system of a portable radio terminal.

Figures 2, 3:
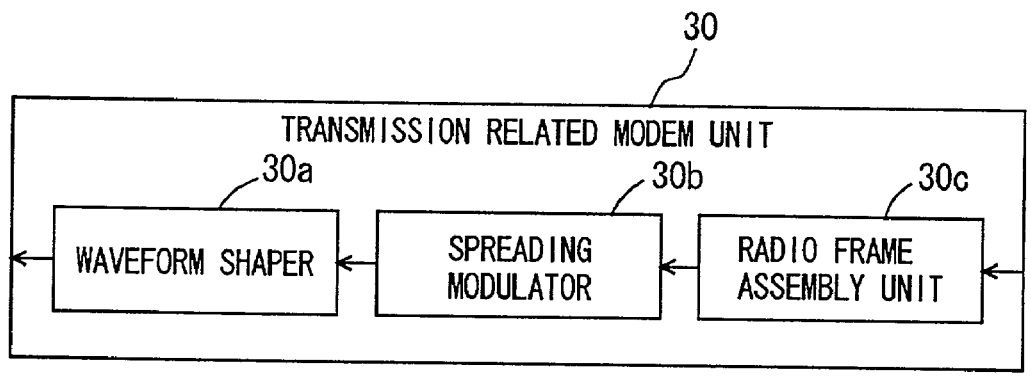
FIG. 2 is a schematic block diagram of a transmission related modem unit in the portable radio terminal of FIG. 1.
FIG. 3 is a diagram to describe an example of the generation rule of orthogonal codes of the present invention.

FIG. 2 is a schematic block diagram of the transmission related modem unit 30 of modem 3a in baseband processor 3 of FIG. 1.

Transmission data output from channel codec 3b of FIG. 1 is assembled into a radio frame at a radio frame assemble unit 30c. The data is applied to a spreading modulator 30b to be subjected to a spreading modulation process by the aforementioned double spreading method.

More specifically, in spreading modulator 30b, orthogonal codes generated by the orthogonal code generation apparatus of the present invention not shown is multiplied by the transmission data for the spreading operation of transmission data. Then, scrambling codes generated by the scrambling code generation apparatus of the present invention not shown is multiplied by transmission data for the scrambling operation of transmission data.

The transmission data subjected to spreading-modulation by spreading modulator 30b is applied to a waveform shaper 30a to be subjected to waveform shaping that limits the transmission occupy band through a digital filter not shown. The transmission data subjected to waveform shaping by waveform shaper 30a is applied to radio processor 2 of FIG. 1.

Details of the orthogonal code generation apparatus of the present invention employed in spreading modulator 30b of FIG. 2 will be described here.

First, the mechanism of orthogonal code generation of the present invention will be described prior to the description of a specific embodiment of the orthogonal code generation apparatus of the present invention.

FIG. 3 is a diagram to describe an example of the orthogonal code generation rule of the present invention. Referring to FIG. 3, the bit period of the orthogonal code sequence to be generated is increased by repeatedly arranging the combination of codes based on a predetermined rule (periodicity), i.e., a pattern of a combination of element codes described afterwards. The repeating index is represented by a period index k. Generally by the rule, $2^k$ types of orthogonal code sequences are defined when the period index is k. Each sequence of orthogonal codes has a bit period of $2^k$.

More specifically, when the period index k is 0 in FIG. 3, the matrix $H_0$ representing all the generated orthogonal codes is formed of only one code 0.

When period index k is 1, matrix $H_1$ representing all the generated orthogonal codes is defined using $H_0$ when k=0, and is formed of a row including two $H_0$, and a row including one $H_0$ and an inverted version thereof. More specifically, $H_1$ is formed of the two orthogonal code sequences [00] and [01].

When period index k is 2, matrix $H_2$ representing all the generated orthogonal codes is defined using $H_1$ when k=1, and is formed of a row of two $H_1$ and a row of one $H_1$ and an inverted version thereof. More specifically, $H_2$ is formed of the four orthogonal code sequences [0000], [0101], [0011] and [0110].

Similarly, as the period index k is incremented by 1, a new orthogonal code matrix is defined from the orthogonal code matrixes of one lower period index.

This relation is generalized as shown in the bottom stage of FIG. 3. Referring to the bottom stage in FIG. 3, when the period index is k, matrix $H_k$ representing all the generated orthogonal codes is defined using $H_{k-1}$ when k=k-1, and is formed of a row of two $H_{k-1}$ and a row of one $H_{k-1}$ and an inverted version thereof.

FIG. 4 specifically shows a matrix $H_4$ of 16 rows×16 columns with all the orthogonal codes that can be generated when period index k is 4. Each of the sixteen rows in this matrix represents a sequence of orthogonal codes that can be generated. Each orthogonal code sequence is identified by a sequence number of 0-15. The sequence number of 0-15 is represented by a sequence number signal B of 4 bits.

The 16 columns in this matrix indicate that each orthogonal code sequence has a bit period of 16 bits. The bit location of each orthogonal code sequence is identified by a location number of 0-15. The location number of 0-15 is represented by a location number signal C of 4 bits.

In the orthogonal code matrix of FIG. 4, the least significant bit of the 4-bit sequence number signal B is 0 or 1. The least significant bit of the 4-bit location number signal C is also 0 or 1.

Figure 5:
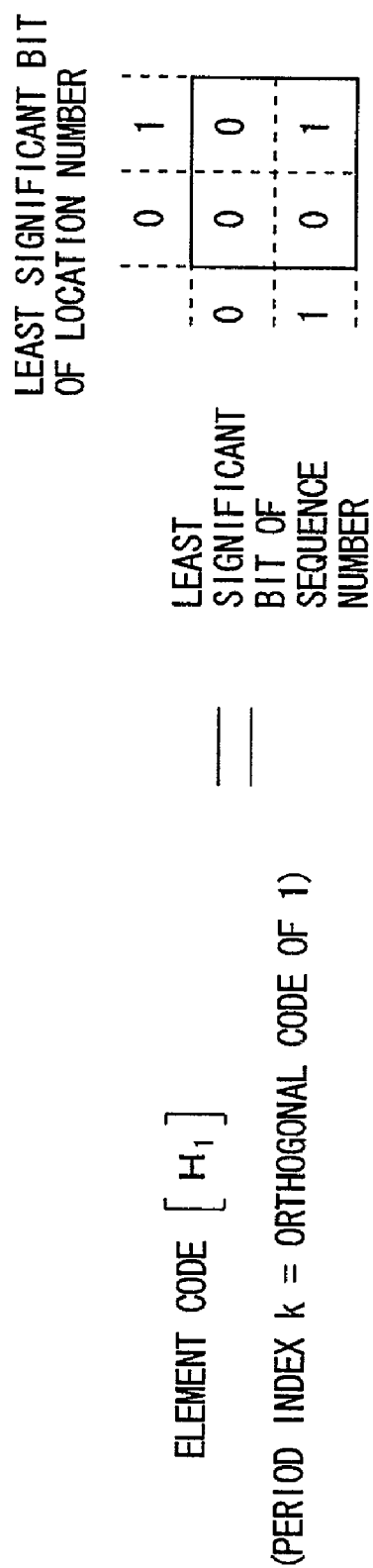
FIG. 5 is a diagram to describe the generation mechanism of element codes of the present invention.

FIG. 5 shows a matrix representing the result that can be generated when these least significant bits are ANDed together. The three "0" and one "1" which are the codes forming this matrix of 2 rows×2 columns are called element codes. This matrix corresponds to matrix $H_1$ where period index k is 1 shown in FIG. 3.

Referring to FIG. 3 again, as apparent by the comparison between the cases where period index k is 1 and where period index k is 2, by inverting matrix $H_1$ only at the second column in the second row corresponding to the location of the element code of "1" with matrix $H_1$ of the element codes of 2 rows×2 columns for k=1 as a repeating unit, matrix $H_2$ for k=2 is constituted.

Similarly, as period index k is incremented, by inverting matrix $H_{k-1}$ only at the second column in the second row corresponding to the location where the element code is "1" with a matrix $H_{k-1}$ for one lower k as a repeating unit, matrix $H_k$ is constituted.

FIG. 6 shows the entire matrix of the orthogonal codes when period index k is 4 of FIG. 4, which is delimited with a matrix $H_1$ of element codes when period index k is 1 and an inverted version thereof as the unit. The vertical axis is identified by three bits of the four bits of sequence number signal B excluding the least significant bit (0 or 1). The horizontal axis is identified by three bits of the four bits of location number signal C excluding the least significant bit (0 or 1).

The present invention is directed to generate by logic operation orthogonal codes of a plurality of sequences (16 sequences) shown in FIG. 4 from a particular arrangement shown in FIG. 6 of matrixes $H_1$ of element codes and the inverted version thereof without having to prestore codes in the memory.

FIG. 7 represents the number of digits where both of corresponding digits take a value of 1 as a result of comparing the sequence number of 3 digits excluding the least significant bit with the location number of 3 digits (excluding the least significant bit). For example, attention is focused on the 3-bit sequence number "000" and the 3-bit location number "010". The number of digits where both of corresponding digits take a value of 1 is 0. As to the 3-bit sequence number "001" and the 3-bit location number "001", the number of digits where both corresponding digits take a value of 1 is 1. As to the 3-bit sequence number "011" and the 3-bit location number "011", the number of digits where both corresponding digits take a value of 1 is 2. As to the 3-bit sequence number "1111 " and the 3-bit location number "111", the number of digits where both corresponding digits take a value of 1 is 3.

By comparing this result with a specific arrangement of FIG. 6 of matrixes $H_1$ of the element codes and the inverted matrixes, it is appreciated that the matrix corresponding to the sequence number and location number that exhibits 0 and an even number for the number of digits both with the value of 1 is $H_1$, and the matrix corresponding to the sequence number and location number that exhibits an odd number for the number of digits both with the value of 1 is an inverted version of $H_1$.

Thus, when an orthogonal code sequence to be generated and the bit location thereof are specified, element codes which are the constitutional elements of matrix $H_1$ are generated by ANDing the least significant bit of the sequence number signal B and the least significant bit of the location number signal at that time. Furthermore, determination is made whether the corresponding matrix $H_1$ of element codes is inverted or not from the combination of the three bits of sequence number signal B excluding the least significant bit and the three bits of location number signal C excluding the least significant bit (the number of digits where both of corresponding digits take a value of 1). From this logic operation, any of the 16 orthogonal code sequences shown in FIG. 4 can be generated. This relationship is not limited to the case where period index k is 4, and is established for any period index k.

First Embodiment

FIG. 8 is a block diagram of an orthogonal code generation apparatus according to a first embodiment of the present invention to realize the above-described orthogonal code generation mechanism. Referring to FIG. 8, n bits of sequence number signal $B_0, B_1, B_2, \ldots, B_n$ specifying an orthogonal code sequence to be generated are supplied in parallel, and n bits of location number signal $C_0, C_1, C_2, \ldots, C_n$ specifying the orthogonal code location to be generated are supplied in parallel, from a control circuit not shown (for example, CPU 3d of FIG. 1).

Among these signal bits, the least significant bit $B_0$ of the sequence number and the least significant bit $C_0$ of the location number are applied to AND circuit $A_0$. The ANDed result is output as an element code. This element code is applied to one input of select circuit 41, and also inverted by inverter 42 to be applied to the other input of select circuit 41.

The remaining (n–1) bits of the sequence number signal and the remaining (n–1) bits of the location number signal are applied to AND circuits $A_1, A_2, A_3, \ldots, A_n$ at respective corresponding digits. The ANDed result of each circuit is output.

In other words, the outputs of these AND circuits $A_1, A_2, A_3, \ldots, A_n$ exhibit 1 when the corresponding digits of the sequence number and location number are both 1, and exhibit 0 otherwise.

The outputs of these AND circuits $A_2, A_2, A_3, \ldots, A_n$ are modulo 2 added at adder circuit 40. More specifically, the outputs of AND circuits $A_1, A_2, A_3, \ldots, A_n$ are summed and a signal indicating the residue of dividing the sum by 2 is applied to the control input of select circuit 41 as a control signal.

In the case where the summation of the outputs of AND circuits $A_1, A_2, A_3, \ldots A_n$ is 0 or an even number, the control signal indicates that the element code output from a corresponding AND circuit $A_0$ belongs to an element code matrix that is not inverted. Select circuit 41 receives this control signal to select and output as the orthogonal code the element code output from corresponding AND circuit $A_0$.

In the case where the summation of the outputs of AND circuits $A_1, A_2, A_3, \ldots, A_n$ is an odd number, the control signal indicates that the element code output from corresponding AND circuit $A_0$ belongs to an inverted element code matrix. Select circuit 41 receives this control signal to select and output as the orthogonal code an inverted version of the element code output from corresponding AND circuit $A_0$ by inverter 42.

Thus, by sequentially applying a counter value that is incremented or decremented as a location number with respect to a sequence number specified from, for example CPU 3d, an orthogonal code forming a specified sequence of orthogonal codes will be sequentially output one bit at a time from select circuit 41.

According to the first embodiment of the present invention, the required orthogonal code is generated by the result of the AND operation of a specified sequence number and location number from a plurality of orthogonal code sequences defined by repeatedly arranging a matrix of element codes based on a period index. Therefore, a memory to prestore a plurality of orthogonal code sequences is dispensable. The circuit complexity can be reduced. Particularly in the case where the bit period of the required orthogonal code sequence is increased, only an AND circuit has to be added. Increase of the circuit complexity of the orthogonal code generation apparatus can be suppressed to the minimum.

Second Embodiment

Figure 9:
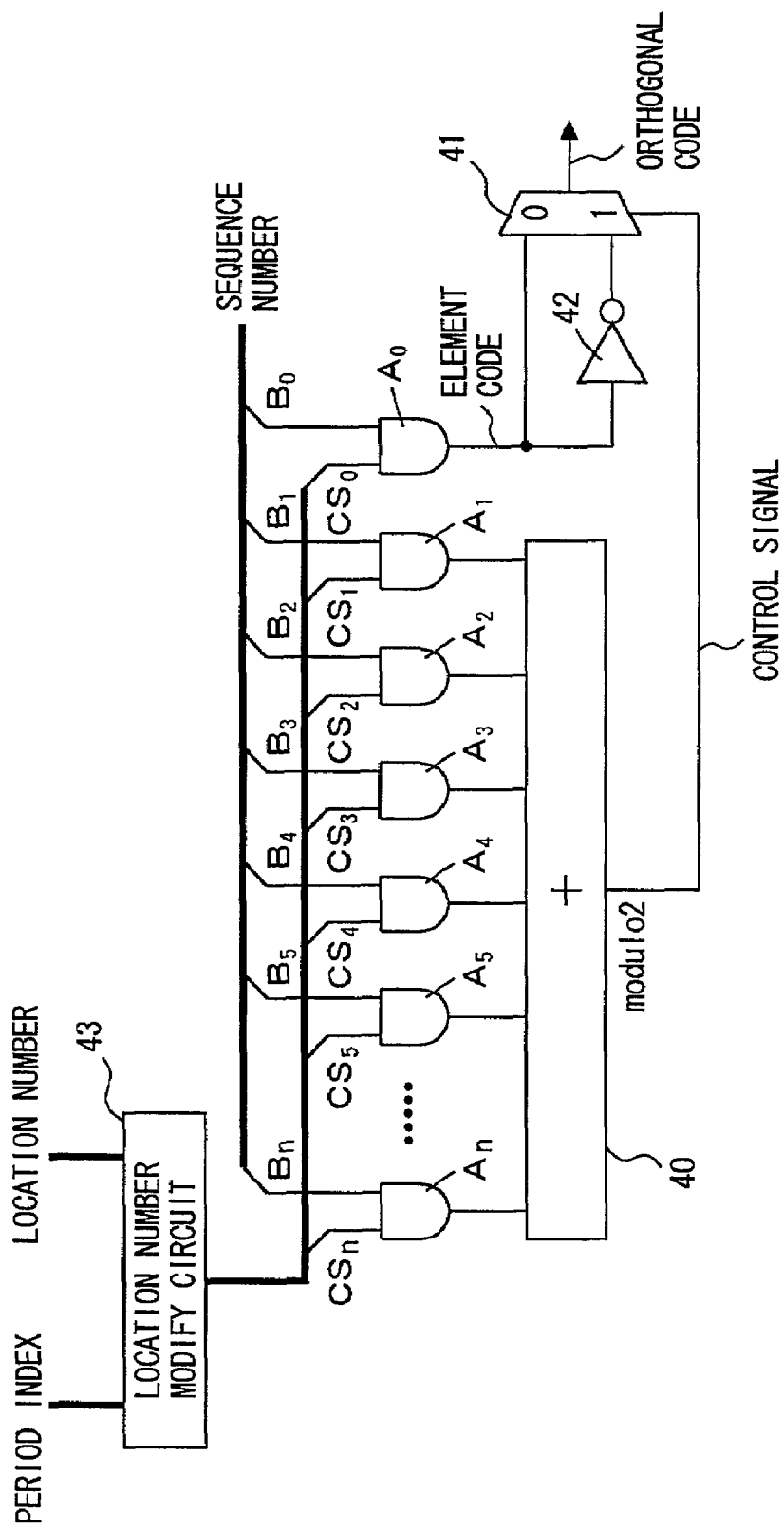

FIG. 9 is a block diagram showing an orthogonal code generation apparatus according to a second embodiment of the present invention. The orthogonal code generation apparatus of FIG. 9 is similar to the orthogonal code generation apparatus according to the first embodiment shown in FIG. 8 except for the following elements set forth below.

The orthogonal code generation apparatus of FIG. 9 includes a location number modify circuit 43 modifying the location number according to period index k. In the second embodiment, an orthogonal code differing from that by the first embodiment of FIG. 4 can be generated as a result of modifying the location number applied from a control circuit not shown (for example, counter in CPU 3d) through location number modify circuit 43.

An example of modifying the location number will be described. When the period index is k, the orthogonal code that can be generated is formed of codes of $2^k$ bits. Therefore, the location number is identified by the lower k bits of a predetermined number of bits of the counter value applied as the logic number from a counter not shown.

In location number modify circuit 43, in response to the application of a location number of a predetermined number of bits (counter value), the arrangement of the lower k bits of the location number is reversed in order, according to period index k, from the least significant bit to the k-th bit. Accordingly, an orthogonal code of a sequence of orthogonal codes specified by the sequence number is output from select circuit 41 one bit at a time according to the increment or decrement of the input counter value which is the location number.

FIG. 10 shows orthogonal codes generated by the orthogonal code generation apparatus of FIG. 9 when period index k is 4.

According to the second embodiment, the orthogonal code generated by the orthogonal code generation apparatus can be altered variably by just adding a location number modify circuit.

Next, a scrambling code generation apparatus of the present invention employed in spreading modulator 30b of FIG. 2 will be described in detail hereinafter.

Third Embodiment

Figure 11:
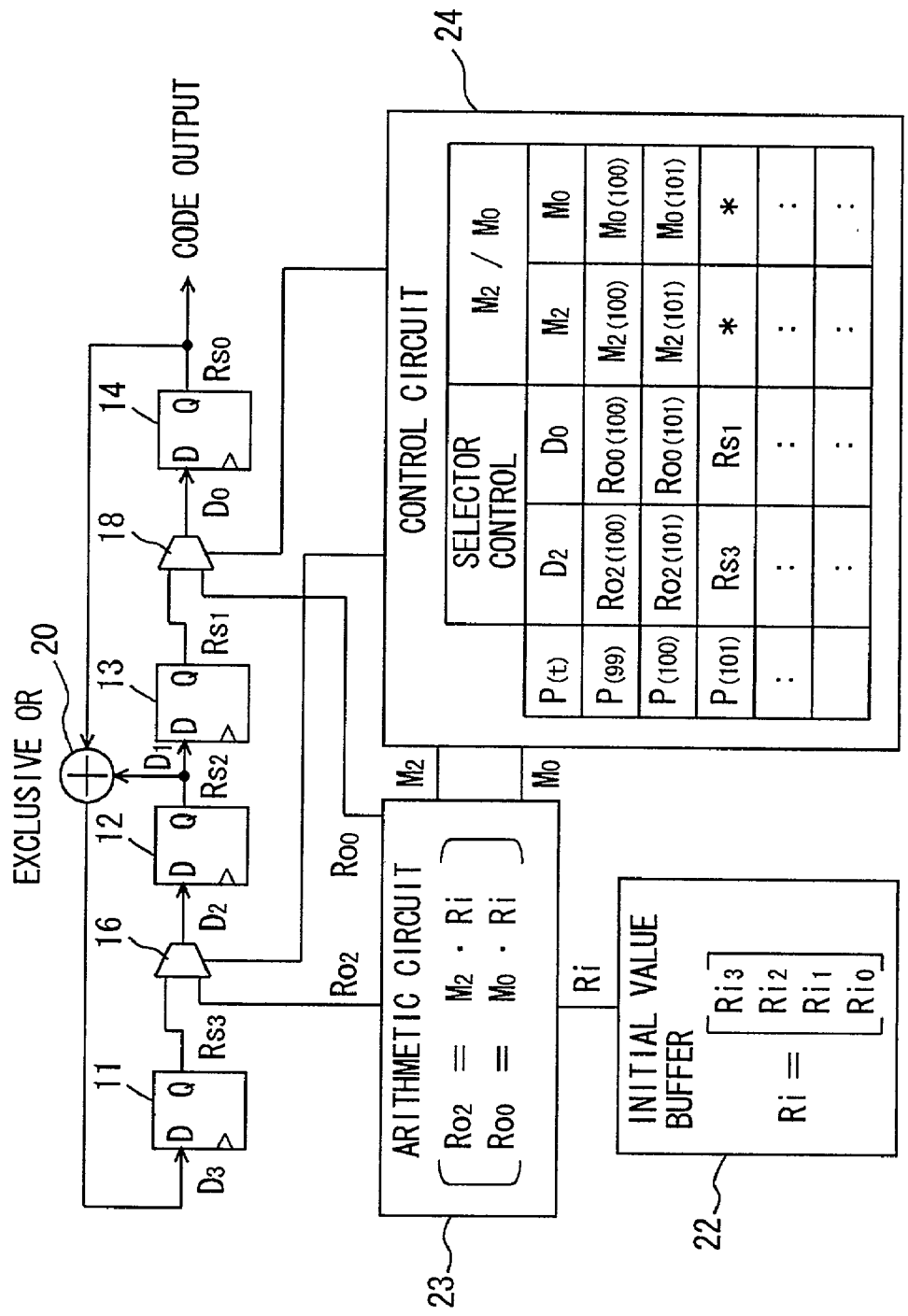
FIGS. 11, 12 and 13 are schematic block diagrams of a scrambling code generation apparatus according to third, fourth and fifth embodiments, respectively, of the present invention.

FIG. 11 is a block diagram of a scrambling code generation apparatus according to a third embodiment of the present invention. The scrambling code generation apparatus of the third embodiment differs from the conventional scrambling code generation apparatus of FIG. 16 in the elements set forth below.

Figure 16:
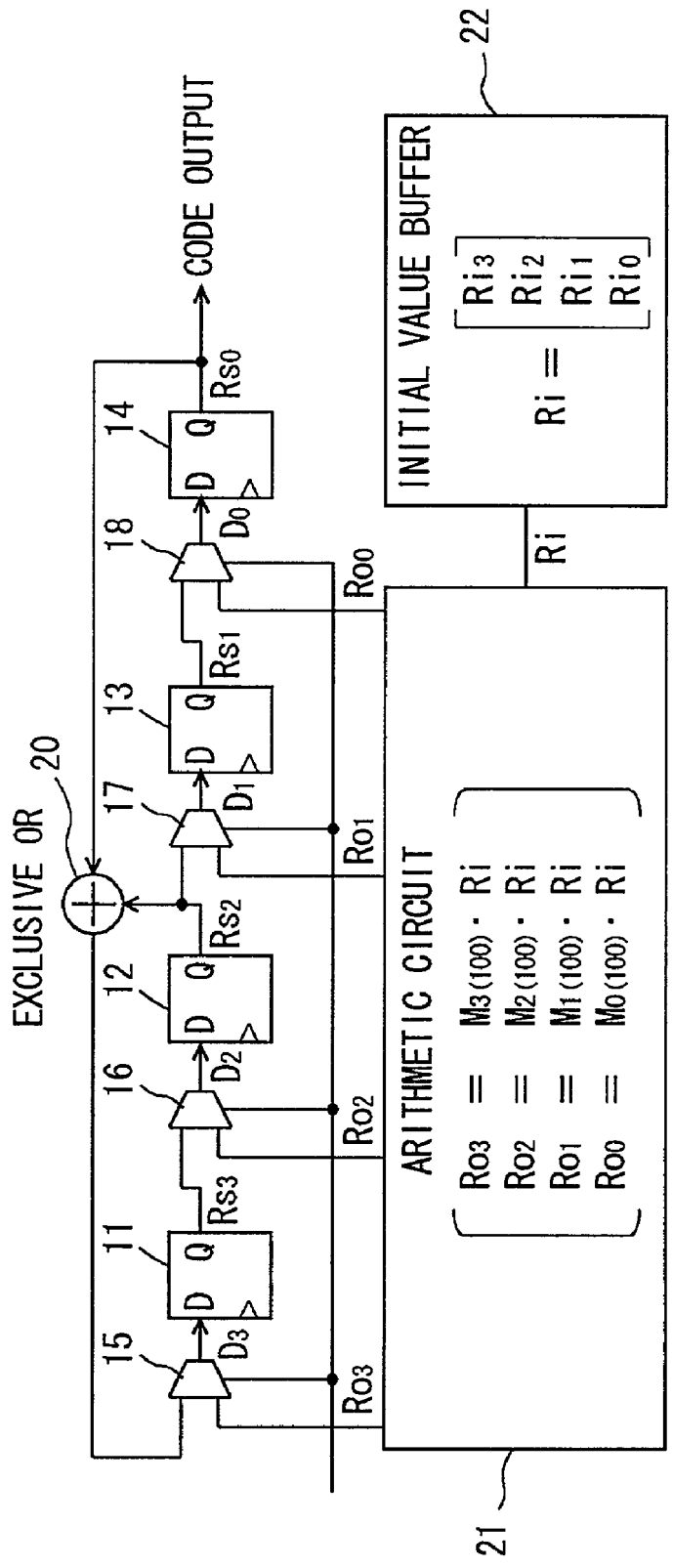
FIG. 16 is a schematic block diagram showing another conventional scrambling code generation apparatus.

The conventional scrambling code generation apparatus of FIG. 16 obtains in advance M matrixes $M_{3(100)}$, $M_{2(100)}$, $M_{1(100)}$, and $M_{0(100)}$ in order to obtain each register value after 100 shift operations from loading initial values to the shift register as described before. Multiplication by initial values Ri is effected at arithmetic circuit 21, whereby all the values of registers 11-14 constituting the shift register are computed and loaded to corresponding registers.

For the purpose of generating a sequence of scrambling codes, not all the values of the registers forming the shift register have to be obtained. Only the values of the registers involved with the feedback operation and spreading operation are required to generate a scrambling code sequence.

More specifically, registers involved with the feedback operation and spreading operation refer to register 14 that outputs a code $Rs_0$ as a scrambling code and feeds back the same to exclusive OR circuit 20, and register 12 feeding back a code $Rs_2$ to exclusive OR circuit 20, among registers 11-14 forming the shift register of the scrambling code generation apparatus of FIG. 11.

If the values of registers 12 and 14 are externally applied at a certain phase according to the structure of FIG. 11, value $D_3$ of register 11 is determined by exclusive OR circuit 20 at the next phase, i.e. after one shift operation. Value $Rs_2$ of register 12 is shifted to register 13. By externally applying values to registers 12 and 14 at this phase once again, all registers 11-14 will retain valid values at the next phase. Then, by continuing the shift operation of the shift register, a sequence of scrambling codes is sequentially output from register 14. In other words, the values of registers originally required are only those of registers 12 and 14.

To this end, the scrambling code generation apparatus of the third embodiment shown in FIG. 11 computes in advance M matrixes $M_{2(100)}$ and $M_{0(100)}$ after 100 shift operations corresponding to registers 12 and 14 and M matrixes $M_{2(101)}$ and $M_{0(101)}$ after 101 shift operations (t=100, 101), and stores the obtained matrixes in a storage region $M_2/M_0$ of the memory or register in control circuit 24.

In addition to the above-described supply method of the M matrixes by storing and reading out from storage means such as a memory or register, a method of implementing control circuit 24 with the hardware of logic gates combined so as to generate these M matrixes can be used. For the sake of simplification, the following embodiments are described with the M matrix stored in a memory. However, the method of supplying the M matrix is not limited thereto.

$$\begin{bmatrix} 0 & 1 & 0 & 1 \\ 1 & 0 & 0 & 0 \\ 0 & 1 & 0 & 0 \\ 0 & 0 & 1 & 0 \end{bmatrix}^t \quad \text{[Expression 8]}$$

In initial value buffer 22, initial values $Ri=[Ri_3, Ri_2, Ri_1, Ri_0]$ inherent to the relevant terminal is applied. In each embodiment, initial value buffer 22 is implemented with, for example, a memory, register or the like.

Arithmetic circuit 23 of FIG. 11 multiplies M matrixes $M_{2(100)}$ and $M_{0(100)}$ after 100 shift operations stored in the memory in control circuit 24 by initial values Ri stored in initial value buffer 22 at the timing of a phase $P_{(99)}$ which is one phase before phase $P_{(100)}$ where the code after 100 shift operations is to be output. As a result, the inputs $Ro_{2(100)}$ and $Ro_{0(100)}$ to registers 12 and 14 at phase $P_{(100)}$ after 100 shift operations are obtained.

The computed values $Ro_{2(100)}$ and $Ro_{0(100)}$ are selected by selectors 16 and 18 under control of control circuit 24 to be applied to corresponding registers 12 and 14 as inputs $D_2$ and $D_0$ to be latched at phase $P_{(100)}$ where the code after 100 shift operations is output. As to outputs $Rs_2$ and $Rs_0$ of registers 12 and 14, respectively, $Rs_0$ is output as a scrambling code, and $Rs_2$ and $Rs_0$ are fed back via exclusive OR circuit 20 to be applied to register 11 as input $D_3$.

Although registers 12 and 14 store and output valid values corresponding to 100 shift operations at the timing of phase $P_{(100)}$ which is after 100 shift operations, it is to be noted that registers 11 and 13 do not yet store valid values at this time.

Therefore, arithmetic circuit 23 multiplies M matrixes $M_{2(101)}$ and $M_{0(101)}$ after 101 shift operations stored in the memory of control circuit 24 by initial values Ri stored in initial value buffer 22 at the timing of phase $P_{(100)}$ after 100 shift operations to compute input values $Ro_{2(101)}$ and $Ro_{0(101)}$ for registers 12 and 14, respectively, at phase $P_{(101)}$ after 101 shift operations.

The computed values $Ro_{2(101)}$ and $Ro_{0(101)}$ are selected by selectors 16 and 18, respectively, to be applied to inputs $D_2$ and $D_0$ of corresponding registers 12 and 14 to be latched at phase $P_{(101)}$ where the code after 101 shift operations is output. At this phase $P_{(101)}$, value $Rs_2$ output from register 12 at phase $P_{(100)}$ is latched in register 13, and value $D_3$ from exclusive OR circuit 20 is latched in register 11.

At this stage, all of registers 11 and 14 store valid values at phase $P_{(101)}$ after 101 shift operations.

The select operation of selectors 16 and 18 are under control of selector control data $D_2$ and $D_0$ stored in the storage region of the memory in control circuit 24 so that output $Rs_3$ of register 11 is applied to the input of register 12 and output $Rs_1$ of register 13 is applied to the input of register 14.

Accordingly, arithmetic circuit 23 does not have to compute the register values after phase $P_{(101)}$. By shifting the valid values stored in registers 11-14, a sequence of scrambling codes can be sequentially generated from the output of register 14.

According to the third embodiment of the present invention, only the values of registers involved with the feedback operation and spreading operation among the plurality of registers forming the shift register are to be computed. Therefore, reduction in circuit complexity of the arithmetic circuit can be contemplated. At first glance, the circuit complexity may seem to have increased in the structure of FIG. 11 in comparison to the conventional apparatus shown in FIG. 16 since control circuit 24 is added. However, it is to be noted that the amount of computation of arithmetic circuit 21 and the circuit complexity of the conventional apparatus of FIG. 16 is significant as the number of stages of the shift register increases. Thus, in the third embodiment of FIG. 11, the advantageous effect of reduction in the amount of computation and the circuit complexity of arithmetic circuit 23 is more significant than the addition of control circuit 24. The circuit complexity of the scrambling code generation apparatus as a whole can be reduced significantly.

Fourth Embodiment

Figure 12:
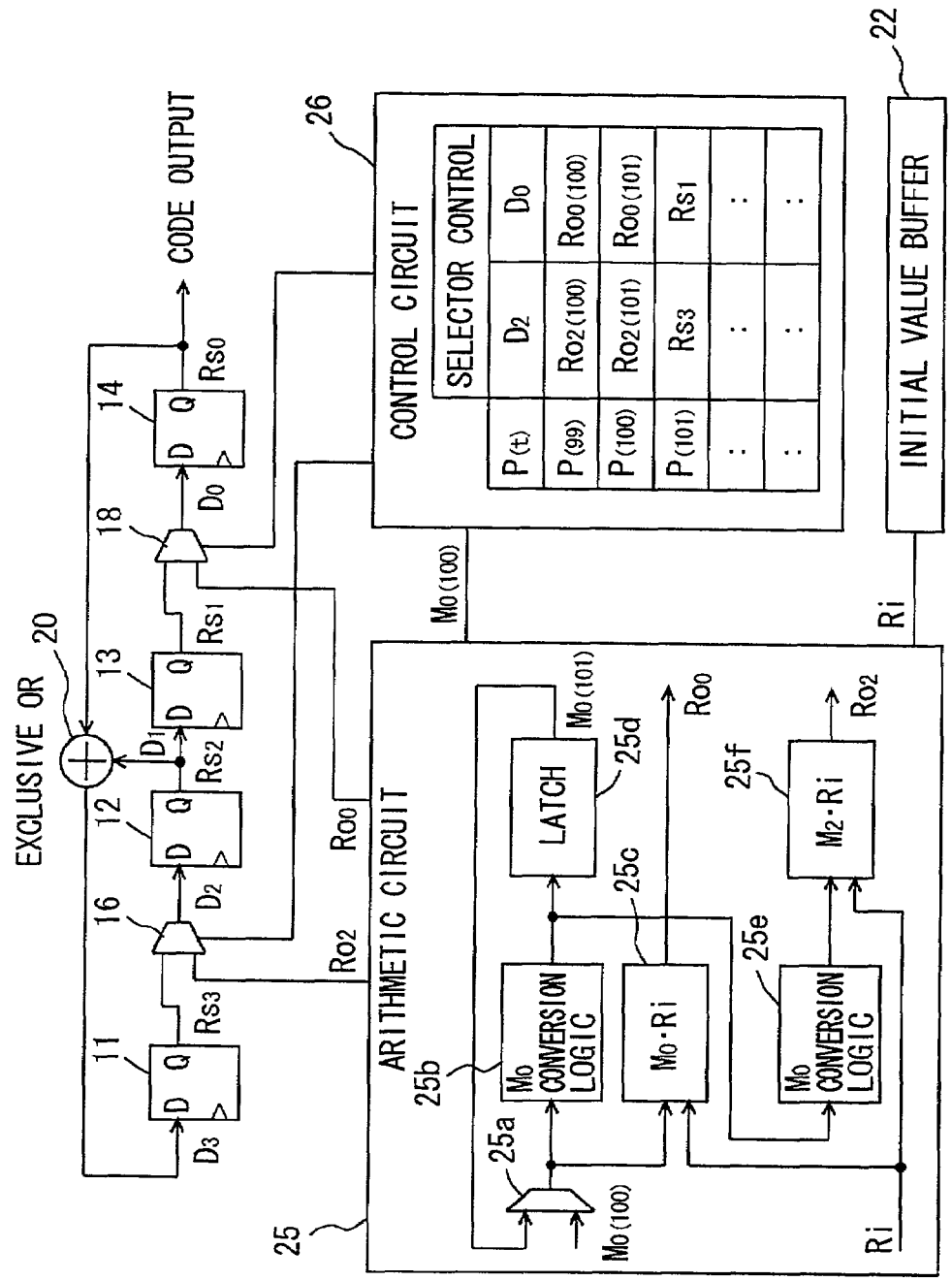

FIG. 12 is a block diagram of a scrambling code generation apparatus according to a fourth embodiment of the present invention. The scrambling code generation apparatus of the fourth embodiment differs from the scrambling code generation apparatus of the third embodiment shown in FIG. 11 in the elements set forth below.

In comparison to the scrambling code generation apparatus of the third embodiment of FIG. 11 wherein M matrixes $M_{2(100)}$, $M_{2(101)}$ corresponding to register 12 and M matrixes $M_{0(100)}$, $M_{0(101)}$ corresponding to register 14 are computed and prestored in a memory in control circuit 24, wherein the M matrixes required for the computation of the register value for each of phases $P_{(99)}$, $P_{(100)}$ are selected and extracted, the scrambling code generation apparatus of the fourth embodiment of FIG. 12 carries out an equivalent process with a different circuit configuration.

More specifically, the value of each register is obtained by a data shifting operation through the shift register and a feedback operation. Therefore, the M matrixes to obtain the values of respective registers are both correlative with time and space. Another M matrix can be obtained from one M matrix with a simple structure by taking advantage of such correlation.

Instead of prestoring the four M matrixes as in the third embodiment of FIG. 11, the remaining three M matrixes can be computed with a simple circuit configuration if one M matrix is applied. The present fourth embodiment corresponds to a circuit configuration where, when $M_{0(100)}$ is applied as one M matrix, the remaining three M matrixes $M_{0(101)}$, $M_{2(100)}$, and $M_{2(111)}$ are obtained.

The M matrix to obtain a value after t shift operations of each register can be computed by segmenting for each row the computation result of the matrix of the above Expression 8. Therefore, the M matrixes after shift operations of the total of (t+1) times corresponding to one further shift operation is obtained by computing the following expression.

$$\begin{bmatrix} 0 & 1 & 0 & 1 \\ 1 & 0 & 0 & 0 \\ 0 & 1 & 0 & 0 \\ 0 & 0 & 1 & 0 \end{bmatrix}^T \begin{bmatrix} 0 & 1 & 0 & 1 \\ 1 & 0 & 0 & 0 \\ 0 & 1 & 0 & 0 \\ 0 & 0 & 1 & 0 \end{bmatrix}$$ [Expression 9]

If the M matrix corresponding to register 14 after t shift operations is represented as $M_{0(t)}$, the matrix elements of this M matrix is represented by the following expression.

$$M_{0(t)} = [M_{0(t,3)} M_{0(t,2)} M_{0(t,1)} M_{0(t,0)}]$$ [Expression 10]

In the case of the above expression, the time relationship between M matrix $M_{0(t)}$ after t shift operations and M matrix $M_{0(t+1)}$ after (t+1) shift operations is represented by the following expressions.

$$M_{0(t+1,3)} = M_{0(t,2)}$$

$$M_{0(t+1,2)} = M_{0(t,3)} \oplus M_{0(t,1)}$$

$$M_{0(t+1,1)} = M_{0(t,0)}$$

$$M_{0(t+1,0)} = M_{0(t,3)}$$ [Expression 11]

Therefore, if each matrix element of $M_{0(100)}$ which is the M matrix of register 14 after 100 shift operations is applied, each matrix element of $M_{0(101)}$ which is the M matrix of register 14 after 101 shift operations can be easily obtained by the above expressions.

Since value $Rs_2$ of register 12 is shifted two times to become the value $Rs_0$ of register 14, the spatial relationship between $M_{0(t)}$ which is the M matrix of register 14 after t shift operations and $M_{2(t)}$ which is the M matrix of register 12 after t shift operations is equivalent to the time relationship between $M_{0(t)}$ which is the M matrix of register 14 after t shift operations and $M_{0(t+2)}$ which is the M matrix of register 14 after (t+2) shift operations.

Therefore, by applying twice the time relationship between $M_{0(t+1)}$ and $M_{0(t)}$ of the above Expression 11, $M_{2(t)}$ can be obtained based on $M_{0(t)}$.

More specifically, first $M_{0(t+1)}$ is obtained from $M_{0(t)}$, and then by obtaining $M_{0(t+2)}$ from $M_{0(t+1)}$, $M_{2(t)}$ can be obtained as a result of the following equations.

$$M_{0(t+1,3)} = M_{0(t,2)}$$

$$M_{0(t+1,2)} = M_{0(t,3)} \oplus M_{0(t,1)}$$

$$M_{0(t+1,1)} = M_{0(t,0)}$$

$$M_{0(t+1,0)} = M_{0(t,3)}$$

$$M_{0(t+2,3)} = M_{0(t+1,2)} = M_{0(t,3)} \oplus M_{0(t,1)}$$

$$M_{0(t+2,2)} = M_{0(t+1,3)} \oplus M_{0(t+1,1)} = M_{0(t,2)} \oplus M_{0(t,0)}$$

$$M_{0(t+2,1)} = M_{0(t+1,0)} = M_{0(t,3)}$$

$$M_{0(t+2,0)} = M_{0(t+1,3)} = M_{0(t,2)}$$ [Expression 12]

Arithmetic circuit 25 of FIG. 12 has the circuit configuration to realize the above-described conversion of the M matrix. Referring to FIG. 12, the M matrix $M_{0(100)}$ of register 14 after 100 shift operations stored in the memory of control circuit 26 is applied to a $M_0$ conversion logic circuit 25b and one input of a multiplier circuit 25c via a selector 25a at phase $P_{(99)}$ after 99 shift operations.

$M_0$ conversion logic circuit 25b converts the applied M matrix $M_{0(100)}$ into the M matrix $M_{0(101)}$ of one further shift, based on the conversion logic of Expression 11, and stores the converted M matrix in latch circuit 25d and provides the same to the next stage $M_0$ conversion logic circuit 25e.

Multiplier circuit 25c multiplies the applied M matrix $M_{0(100)}$ by initial values Ri stored in initial value buffer 22 to generate a value $Ro_0$ of register 14. $Ro_0$ is applied to the input of register 14 via selector 18.

$M_0$ conversion logic circuit 25e further converts $M_{0(101)}$ output from $M_0$ conversion logic circuit 25b into $M_{0(102)}$ of one further shift, i.e. into $M_{2(100)}$ based on the conversion logic of Expression 11. The converted value is applied to a multiplier circuit 25f. Multiplier circuit 25f multiplies the applied M matrix $M_{2(100)}$ by initial values Ri stored in initial value buffer 22 to generate a value $Ro_{2(100)}$ of register 12 to be applied to the input of register 12 via selector 16.

These computed values $Ro_{2(100)}$ and $Ro_{0(100)}$ are latched in registers 12 and 14, respectively, at phase $P_{(100)}$ after 100 shift operations. Therefore, registers 12 and 14 store and output valid values after 100 shift operations at phase $P_{(100)}$. However, valid values are not yet stored in registers 11 and 13 at the current stage.

At the timing of the phase $P_{(100)}$, $M_{0(101)}$ stored in latch circuit 25d is selected via selector 25a to be applied to $M_0$ conversion logic circuit 25b and multiplier circuit 25c.

$M_{0(101)}$ applied to $M_0$ conversion logic circuit 25b is subjected to conversion based on the conversion logic of Expression 11 to be applied to $M_0$ conversion logic circuit 25e and further subjected to conversion based on the conversion logic of Expression 11. In other words, $M_{0(101)}$ is converted into $M_{2(10)}$ spatially by two conversion logic processes and applied to multiplier circuit 25f.

Multiplier circuit 25c multiplies the applied $M_{0(101)}$ by initial values Ri stored in initial value buffer 22 to generate a value $Ro_{0(101)}$ of register 14 to be applied to the input of register 14 via selector 18.

Multiplier circuit 25f multiplies the applied $M_{2(101)}$ by initial values Ri stored in initial value buffer 22 to generate a value $Ro_{2(101)}$ of register 12 to be applied to the input of register 12 via selector 16.

Computed values $Ro_{2(111)}$ and $Ro_{0(101)}$ are latched in registers 12 and 14, respectively at phase $P_{(101)}$ after 101 shift operations. In this phase, value $Rs_2$ output from register 12 at phase $P_{(100)}$ is latched in register 13, and value $D_3$ from exclusive OR circuit 20 is latched in register 11.

Therefore, all of registers 11-14 store valid values at phase $P_{(01)}$ after 101 shift operations at this time point.

Thereafter, the select operation of selectors 16 and 18 are controlled by the selector control data stored in the storage region of the memory in control circuit 24 so that output $Rs_3$ of register 11 is applied to register 12 and output $Rs_1$ of register 13 is applied to register 14.

Thus, arithmetic circuit 25 does not have to compute the register values after phase $P_{(101)}$. By shifting the valid values stored in registers 11-14, a sequence of scrambling codes can be sequentially obtained from output of register 14.

According to the fourth embodiment of the present invention, a function equivalent to that of the third embodiment of FIG. 11 can be realized. By computing only the values of the registers involved with the feedback operation and spreading operation among the registers forming the shift register, reduction in circuit complexity of the arithmetic circuit can be contemplated. Since only one M matrix is stored, which is used to compute the remaining three M matrixes with a simple circuit configuration, instead of storing the total of four M matrixes over two continuous phases as in the previous third embodiment, the required memory capacity is reduced. Thus, the circuit configuration of the entire scrambling code generation apparatus can be further reduced.

Fifth Embodiment

Figure 13:
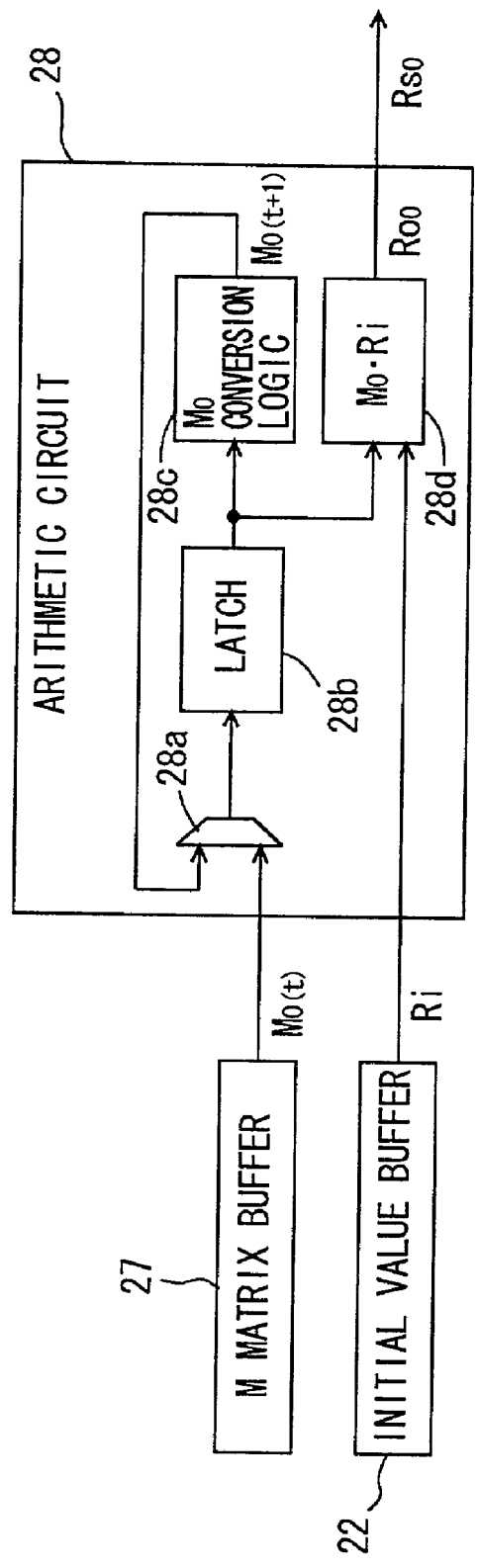
Figure 14:
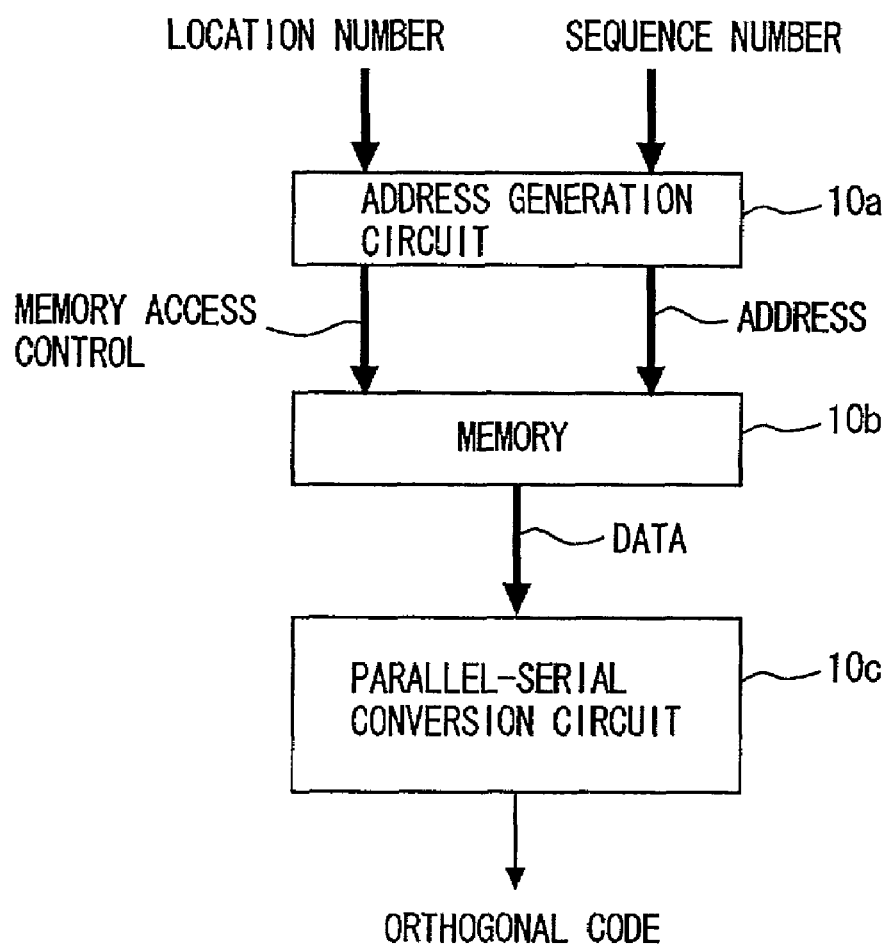
FIG. 14 is a schematic block diagram showing a conventional orthogonal code generation apparatus.
Figure 15:
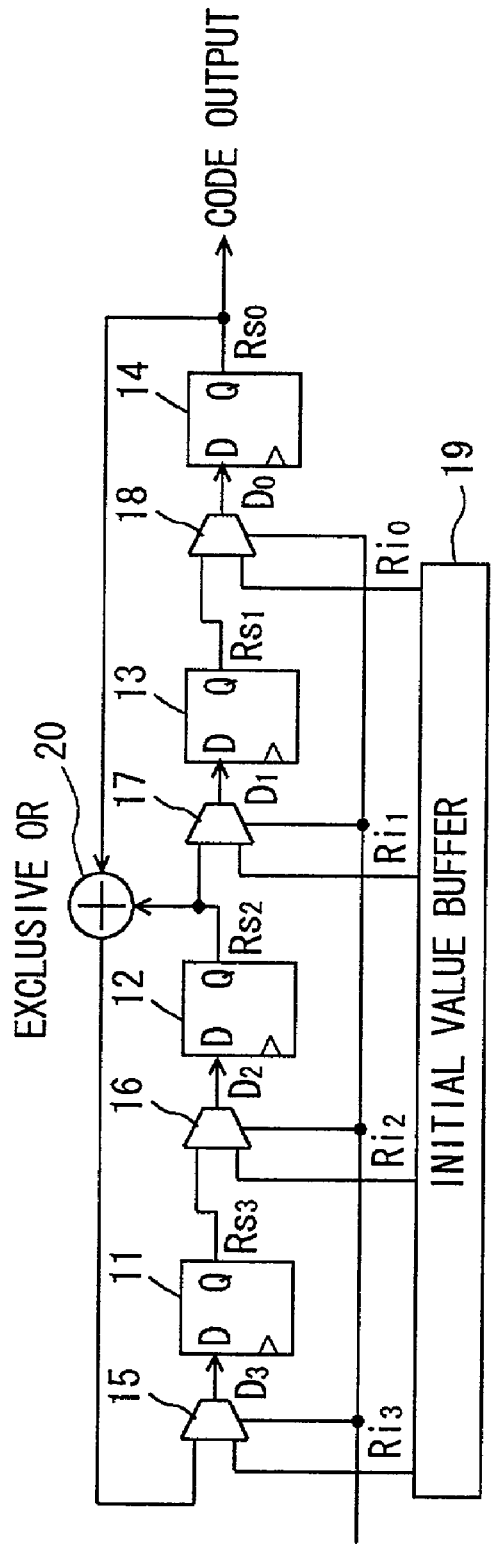
FIG. 15 is a schematic block diagram showing a conventional scrambling code generation apparatus.

FIG. 13 is a block diagram showing a scrambling code generation apparatus according to a fifth embodiment of the present invention.

In the previous third and fourth embodiments, the values of registers 12 and 14 are generated and loaded into corresponding registers through arithmetic circuit 23 or 25 to generate a sequence of spreading codes by the shift operation of the shift register after all registers 11-14 store valid register values.

Focusing on arithmetic circuit 25 of the fourth embodiment shown in FIG. 12, it is noted that value $Ro_0$ output from multiplier circuit 25c is the value output as spreading code $Rs_0$ via selector 18 and register 14. Therefore, by continuously extracting output $Ro_0$ of multiplier circuit 25c, a sequence of scrambling codes can be directly generated without having to use the shift register.

The scrambling code generation apparatus according to the fifth embodiment of the present invention shown in FIG. 13 corresponds to a structure in which arithmetic circuit 25 of the fourth embodiment shown in FIG. 12 is simplified.

Referring to FIG. 13, M matrix $M_{0(t)}$ after t shift operations stored in an M matrix buffer 27 is selected by a selector 28a and stored in a latch 28b. The output of latch 28b is applied to a $M_0$ conversion logic circuit 28c and a multiplier circuit 28d. Similar to the previous embodiments, M matrix buffer 27 may be implemented with storage means such as a memory, a register, or the like, or implemented with hardware of logic gates combined so as to generate the M matrix.

Multiplier circuit 28d multiplies the applied $M_{0(t)}$ by initial values Ri stored in initial value buffer 22 to generate $Ro_{0(t)}$. This value is output as scrambling code $Rs_{0(t)}$.

$M_0$ conversion logic circuit 28c converts $M_{0(t)}$ into $M_{0(t+1)}$ based on the conversion logic of Expression 11. The converted matrix is stored in latch 28b via selector 28a. The output of latch 28b is applied to $M_0$ conversion logic circuit 28c and multiplier circuit 28d.

Multiplier circuit 28d multiplies the applied $M_{0(t+1)}$ by initial values Ri stored in initial value buffer 22 to generate $Ro_{0(t+1)}$. This value is output as scrambling code $Rs_{0(t+1)}$.

By repeatedly applying the conversion logic of Expression 11 for each phase based on one M matrix $M_{0(t)}$ stored in M matrix buffer 27, an M matrix corresponding to each phase can be sequentially generated at $M_0$ conversion logic circuit 28c, and multiplied by initial values Ri at multiplier circuit 28d, whereby a sequence of scrambling codes $Rs_0$ is generated.

According to the fifth embodiment of the present invention, a sequence of scrambling codes is generated directly from an arithmetic circuit without the usage of the shift register. Therefore, the scrambling code generation apparatus can further be reduced in circuit complexity.

The present invention is configured to generate the required orthogonal code by the result of a logic operation on the specified sequence number and location number from a plurality of orthogonal code sequences defined based on a predetermined orthogonal code generation rule. Therefore, a memory to prestore a plurality of orthogonal code sequences is dispensable. Reduction of the circuit complexity can be contemplated. Particularly, increase of the circuit complexity of the orthogonal code generation apparatus can be suppressed even if the bit period of the required orthogonal code sequence is increased.

Furthermore, the present invention is configured to compute, using an arithmetic circuit, only values of the registers involved with the feedback operation and spreading operation among the plurality of stages of registers forming the shift register. Therefore, the circuit complexity of the arithmetic circuit can be reduced. Particularly, increase of the circuit complexity of the entire scrambling code apparatus can be suppressed even in the case where the number of stages of the shift register is increased.

Since the present invention is configured to generate a sequence of scrambling codes directly by an arithmetic circuit without using the shift register, the circuit complexity of the scrambling code generation apparatus can be further reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scrambling code generation apparatus generating a scrambling code used in a scrambling operation of transmission data, comprising:
    a shift register formed of a plurality of stages of registers connected so as to execute a feedback operation and a spreading operation to generate a sequence of scrambling codes by a predetermined generating polynomial;
    an arithmetic circuit computing values of said registers involved with said feedback operation and said spreading operation that would have been obtained if said shift register carries out a shift operation for an increasing predetermined number of times based on predetermined initial values;
    an input circuit applying said computed values of registers into corresponding said registers; and
    a control circuit controlling said arithmetic circuit and said input circuit so that said arithmetic circuit computes values of said registers and said input circuit applies said computed values into said registers until all said plurality of stages of registers store valid values based on said computed values;
    wherein said shift register continues a shift operation based on valid values stored in all of said plurality of stages of registers to generate said sequence of scrambling codes.

2. The scrambling code generation apparatus according to claim 1, further comprising:
    a storage circuit storing said predetermined initial values; and
    a matrix supply circuit supplying a matrix to determine values of registers involved with said feedback operation and said spreading operation after shift operations of said increasing predetermined number of times based on said predetermined generating polynomial,
    wherein said arithmetic circuit multiplies said predetermined initial values stored in said storage circuit by said matrix supplied from said matrix supply circuit to compute values of said registers.

3. The scrambling code generation apparatus according to claim 1, further comprising a storage circuit storing said predetermined initial values,
    wherein said arithmetic circuit obtains by a predetermined operation a matrix to determine values of registers involved with said feedback operation and said spreading operation after shift operations of said increasing predetermined number of times based on said predetermined generating polynomial, and multiplying by said predetermined initial values stored in said storage means to compute values of said registers.

4. A portable radio terminal of digital radio communication, comprising:
    a transmission related modem modulating transmission data; and
    a radio processor applying processing for radio communication on transmission data of said transmission related modem to send out the processed data as a transmission radio signal;
    said transmission related modem comprising a scrambling code generation apparatus generating a scrambling code used in a scrambling operation of said transmission data,
    said scrambling code generation apparatus comprising:
    a shift register formed of a plurality of stages of registers connected so as to execute a feedback operation and a spreading operation to generate a sequence of scrambling codes by a predetermined generating polynomial;
    an arithmetic circuit computing values of said registers involved with said feedback operation and said spreading operation that would have been obtained if said shift register carries out a shift operation for an increasing predetermined number of times based on predetermined initial values;
    an input circuit applying said computed values of registers into corresponding said registers; and
    a control circuit controlling said arithmetic circuit and said input circuit so that said arithmetic circuit computes values of said registers and said input circuit applies said computed values into said registers until all said plurality of stages of registers store valid values based on said computed values;
    wherein said shift register continues a shift operation based on valid values stored in all of said plurality of stages of registers to generate said sequence of scrambling codes.

5. The portable radio terminal according to claim 4, further comprising:
    a storage circuit storing said predetermined initial values; and
    a matrix supply circuit supplying a matrix to determine values of registers involved with said feedback operation and said spreading operation after shift operations of said increasing predetermined number of times based on said predetermined generating polynomial,
    wherein said arithmetic circuit multiplies said predetermined initial values stored in said storage circuit by said matrix supplied from said matrix supply circuit to compute values of said registers.

6. The portable radio terminal according to claim 4, further comprising a storage circuit storing said predetermined initial values,
    wherein said arithmetic circuit obtains by a predetermined operation a matrix to determine values of registers involved with said feedback operation and said spreading operation after shift operations of said increasing predetermined number of times based on said predetermined generating polynomial, and multiplying by said predetermined initial values stored in said storage means to compute values of said registers.

* * * * *